(12) United States Patent
Sato et al.

(10) Patent No.: US 7,676,101 B2
(45) Date of Patent: Mar. 9, 2010

(54) METHOD AND APPARATUS FOR COMPENSATING FOR MOTION PREDICTION

(75) Inventors: Kazushi Sato, Chiba (JP); Yoichi Yagasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 1009 days.

(21) Appl. No.: 10/725,061

(22) Filed: Dec. 2, 2003

(65) Prior Publication Data

US 2004/0161157 A1 Aug. 19, 2004

(30) Foreign Application Priority Data

Dec. 2, 2002 (JP) ............................. 2002-350138

(51) Int. Cl.
*G06K 9/36* (2006.01)
*G06K 9/46* (2006.01)
*H04N 7/12* (2006.01)

(52) U.S. Cl. .................. 382/238; 382/236; 375/240.16

(58) Field of Classification Search ....................... None
See application file for complete search history.

(56) References Cited

U.S. PATENT DOCUMENTS

| | | | | |
|---|---|---|---|---|
| 5,477,272 | A * | 12/1995 | Zhang et al. | 375/240.06 |
| 5,731,850 | A * | 3/1998 | Maturi et al. | 348/699 |
| 5,761,398 | A * | 6/1998 | Legall | 358/1.15 |
| 5,825,930 | A * | 10/1998 | Park et al. | 382/236 |
| 6,219,383 | B1 * | 4/2001 | Park | 375/240.16 |
| 6,549,575 | B1 * | 4/2003 | Butter et al. | 375/240.16 |
| 6,560,371 | B1 * | 5/2003 | Song et al. | 382/240 |
| 6,850,569 | B2 * | 2/2005 | Park et al. | 375/240.16 |
| 6,968,008 | B1 * | 11/2005 | Ribas-Corbera et al. | 375/240.16 |
| 6,968,009 | B1 * | 11/2005 | Straasheijm | 375/240.16 |
| 7,079,581 | B2 * | 7/2006 | Noh et al. | 375/240.16 |

FOREIGN PATENT DOCUMENTS

| | | |
|---|---|---|
| JP | 05-236466 | 9/1993 |
| JP | 07-123411 | 5/1995 |
| JP | 2001-189934 | 7/2001 |

OTHER PUBLICATIONS

Rate-Distortion Optimization for Video Compression, Gary J. Sullivan et al, IEEE Signal Processing Magazine, Nov. 1998, pp. 74-90.

* cited by examiner

*Primary Examiner*—Yuzhen Ge
(74) *Attorney, Agent, or Firm*—Oblon, Spivak, McClelland, Maier & Neustadt, L.L.P.

(57) ABSTRACT

A process burden for code processing is reduced by the present system and method while possibly avoiding the lowering of image quality. When compensating for motion prediction by using a multi-reference frame while sequentially changing the pixel-based sizes of motion compensating blocks, a size-reduced block is generated depending upon a motion compensating block having the greatest pixel-based size to be taken as the uppermost layer among the pixel-based sizes. Thereafter, motion vector search ranges are determined respectively within the reference frame images, on the basis of a plurality of size-reduced reference images reduced in size respectively corresponding to the size-reduction ratios of the size-reduced blocks and the size-reduced blocks. Using the determined search range, an optimal motion vector is detected while sequentially changing the pixel-based sizes of the motion compensating blocks. This can detect a motion vector by only a limited search range within the reference frame image.

10 Claims, 15 Drawing Sheets

- ●: INTEGER POSITION SAMPLES
- ○: SAMPLES AT ONE EIGHT POSITIONS
- ◍: SAMPLES AT HALF AND QUARTER POSITIONS

⟋⟋ : PIXEL USED FOR mv SEARCH

METHOD AND APPARATUS FOR COMPENSATING FOR MOTION PREDICTION

BACKGROUND OF THE INVENTION

1. Technical Field of the Invention

This invention relates to a method and apparatus for compensating for motion prediction, which is suitably applicable to an image coding apparatus for transmitting, for example, motion picture signals over networks, such as the Internet.

2. Description of the Related Art

An image coding apparatus, conventionally, is configured to digitize a motion image signal supplied from an external source and then carries out code processing on it conforming to a predetermined image-coding scheme, thereby generating image-compressed information.

The foregoing image-coding scheme is a known image coding scheme, called MPEG, standardized for the purpose of coding a general-use image by the Moving Picture Experts Group (MPEG) of ISO/IEC, and the image-coding scheme, called H.26* (i.e., H.261, H.262, . . . ), standardized aiming at coding a television-conference image.

Meanwhile, the recent widespread use of personal digital assistants (PDA's) including cellular phones gives rise to the need for an image-coding scheme to realize still higher coding efficiency. In order to cope with this, the standardization of another image-coding scheme, called JVT (Joint Model of Enhanced-Compression Video Coding) (hereinafter, this is called a JVT coding scheme), is currently being pushed forward by the MPEG and ITU entities.

Under the JVT coding scheme, when carrying out motion-prediction compensation, motion vectors can be searched over the macro-block having vertically horizontally 16×16 pixels with the use of four kinds of size patterns (hereinafter, this is referred to as a macro-block mode) TP1-TP4, e.g. four sets of motion compensating blocks comprising one set of pixel blocks having a size of vertical/horizontal 16×16 pixels (hereinafter, this is referred to as motion compensating blocks), two sets of motion compensating blocks each having a size of vertical/horizontal 8×16 pixels, two sets of motion compensating blocks each having a size of vertical/horizontal 16×8 pixels, or four sets of motion compensating blocks each having a size of vertical/horizontal 8×8 pixels, as shown in FIG. 16. Each of the motion compensating blocks related to these macro-block modes TP1-TP4 can independently have the motion vectors.

Furthermore, concerning the four sets of motion compensating blocks related to the macro-block mode TP4, motion vectors can be searched on each of the four sets of the compensating blocks by use of four kinds of sub-size patterns (hereinafter, this is referred to as a sub-macro block mode) TP5-TP8, e.g. one set of motion compensating blocks having a size of vertical/horizontal 8×8 pixels, two sets of motion compensating blocks each having a size of vertical/horizontal 4×8 pixels, two sets of motion compensating blocks each having a size of vertical/horizontal 8×4 pixels, or four sets of motion compensating blocks each having a size of vertical/horizontal 4×4 pixels. Each of the motion compensating blocks related to these sub-macro block modes can independently have the motion vectors.

Accordingly, under the JVT coding scheme, one macro-block can have 16 motion vectors in maximum (see, for example, Draft ISO/IEC 14496-10:2002 (e)), the entire contents of which being incorporated herein by reference.

Meanwhile, under the JVT coding scheme, when compensating for motion prediction, it is possible to hold a group SF of a plurality of reference frame images. It is possible to carry out a block matching by using two or more reference frame images SF1, SF2 and SFn−1 existing prior (past) to an objective frame image OF to be code-processed, a block matching by using two or more reference frame images (not shown) existing subsequent (future) to an objective frame image OF, or a block matching by using two or more reference frame images (not shown) existing at around an objective frame image OF. The group SF of reference frame images held as the referential candidates is referred to as a Multiple Reference Frame (see, for example, Draft ISO/IEC 14496-10:2002 (e)). Furthermore, the JVT coding scheme adopts optimized motion-prediction compensation called Rate-Distortion Optimization (hereinafter, this is referred to as RD optimization). By RD optimization, all the macro-blocks of an objective frame image OF can be block-matched with the group SF of a plurality of reference frame images (FIG. 16), thereby determining a difference value (distortion) in a difference absolute-value sum or the like. Taking into account a quantizing function (Lagrange multiplier for motion vectors) and generation code amount of motion vector difference, a motion vector is searched for which can generate a minimum code amount, thereby enhancing the coding efficiency for motion vectors See DRAFT ISO/IEC 14496-10: 2002(E), and Rate-Distortion Optimization for Video Compression (G. Sullivan and T. Wiegand, IEEE Signal Processing Magazine, 1998-11), the entire contents of which being incorporated herein by reference.

Meanwhile, in the coding apparatus employing the foregoing JVT coding scheme, while all the macro-blocks are changed to motion compensating blocks in various pixel-based sizes (FIG. 16) between the macro-block entirety and a group SF of a plurality of reference frame images, reference is made to a generation code amount table representative of a generated code amount of motion vector difference and further a quantizing function (Lagrange multiplier for motion vectors) is determined besides a difference value (distortion), thereby carrying out a motion-prediction compensation. Thus, the present inventors have recognized that there is a drawback that process burden is increased due to code processing.

SUMMARY OF THE INVENTION

It is an object of the present invention to provide a method and apparatus for compensating for motion prediction which can reduce the process burden due to code processing while possibly avoiding the lowering image quality.

In order to solve the foregoing and other problems, in the present invention, when compensating for motion prediction on each motion compensating blocks formed by dividing an objective frame image of successive frame images by using a plurality of reference frame images while sequentially changing pixel-based sizes of the motion compensating blocks. Pixels are thinned out of the motion compensating block having a greatest one of the pixel-based size to be taken as an uppermost layer of among the pixel-based sizes, to generate a size-reduced block in a lower layer having a predetermined size-reduction ratio. Thereafter, motion vector search ranges are determined respectively within the reference frame images, on the basis of the size-reduced blocks and a plurality of size-reduced reference images reduced in size correspondingly respectively to the size-reduction ratios of the size-reduced blocks. An optimal one of the motion vectors is detected while sequentially changing the pixel-based sizes of the motion compensating blocks by using the search range determined.

In this case, motion vectors can be detected only in a limited search range of each reference frame image without using the entire of the reference frame images.

DETAILED DESCRIPTION OF THE INVENTION

JVT Coding Scheme Overview

At the outset, explanation is made on the motion compensation as defined under the JVT coding scheme. Under the JVT coding scheme, motion compensation is available at ¼-pixel accuracy and at ⅛-pixel accuracy. The motion compensation process at ¼-pixel accuracy (interpolation process) is explained with reference to FIG. 1.

The JVT coding scheme uses a FIR (Finite Impulse Response) filter as a band limiting filter, to compensate for motion. As a filter coefficient for generating a pixel-based value (luminance signal) at ½-pixel accuracy, there is defined a 6-tap filter coefficients as follows.

$$\{1,-5,20,20,-5,1\} \quad (1)$$

Figure 1:
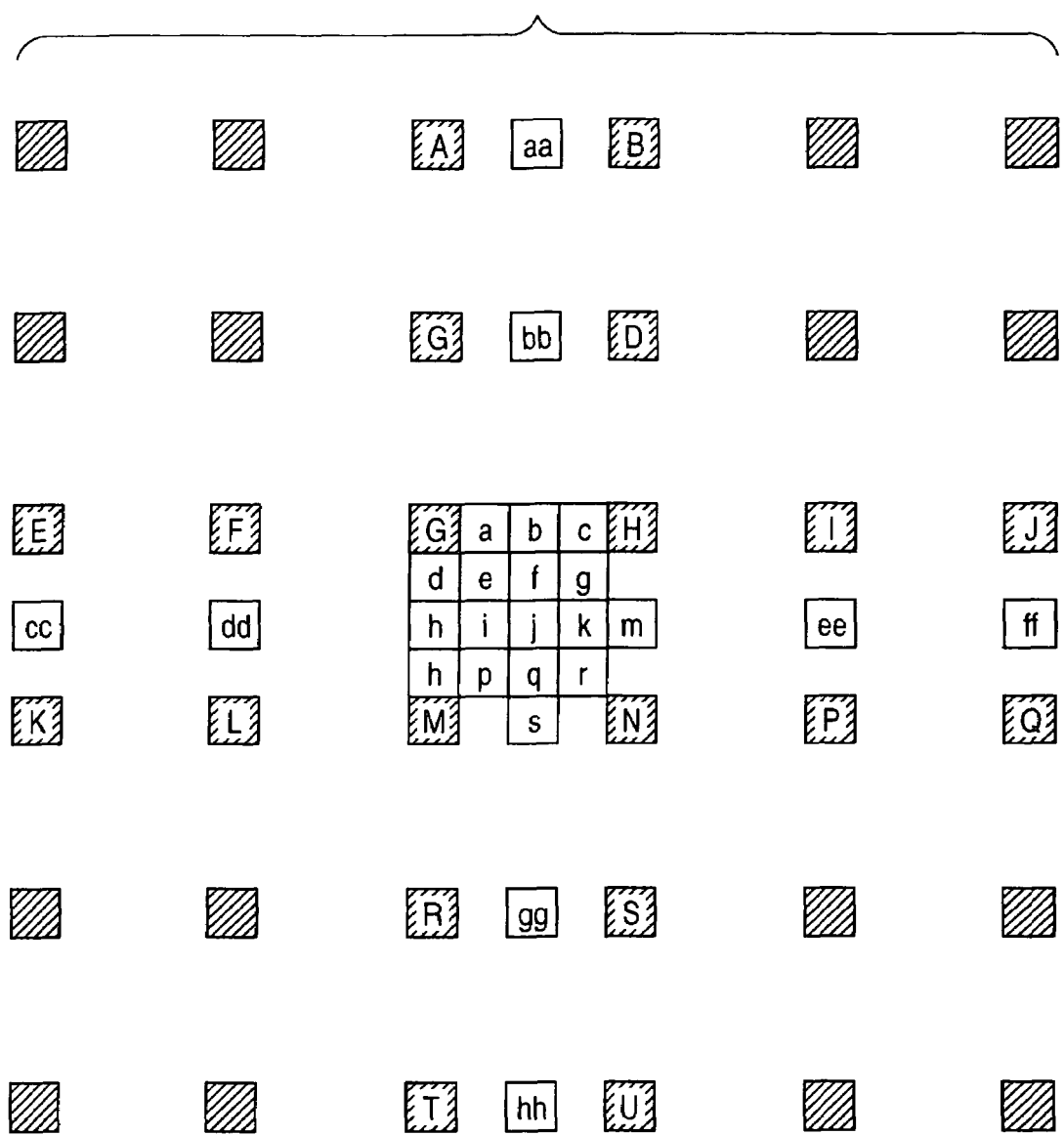
FIG. 1 is a schematic diagram for explaining the motion compensation at ¼-pixel accuracy under the JVT coding scheme.

Herein, as for the motion compensation (interpolation) for the pixel-based value b, h shown in FIG. 1, sum-of-products operation is made by the use of the filter coefficients of vector (1), according to the following equation.

$$b=(E-5F+20G+20H-5H+J)$$

$$h=(A-5C+20G+20M-5R+T) \quad (2)$$

Then, provided that the 8 bits of from "0" to "255" are considered as Clip 1, computation is to be made by a clip process to remove the other part than Clip 1 as given in the following equation.

$$b=\text{Clip1}((b+16)>>5)$$

$$h=\text{Clip1}((h+16)>>5) \quad (3)$$

In this connection, ">>5" in Equation (3) means to shift by 5 bits, wherein actually division is in an amount of $2^5$. Meanwhile, "+16" in Equation (3) is in order not to remove fractions (not to be rounded) when division is made in an amount of $2^5$.

Meanwhile, concerning the pixel-based value j, a pixel-based values aa, bb, cc, dd, ee, ff, gg, hh are generated similarly to the foregoing pixel-based value b, h by the use of the filter coefficients of Vector (1). Thereafter, using the filter coefficients of Vector (1), sum-of-products operation is made according to the following equation $$j=cc-5dd+20h+20m-5ee+ff \quad (4)$$

or the following equation $$j=aa-5bb+20b+20s-5gg+hh \quad (5)$$

Thereafter, a clip process is made according to the following equation, thus carrying out computation.

$$j=\text{Clip1}((j+512)>>10) \quad (6)$$

Meanwhile, the pixel-based values a, c, d, n, f, i, k, q can be computed by a linear interpolation with a pixel-based values at integer-pixel accuracy (corresponding to the hatching in the figure) and a pixel-based value G, H, UB1, h, j, m, s at ½-pixel accuracy, as given in the following equation.

$$a=(G+b)>>1$$

$$c=(H+b)>>1$$

$$d=(G+h)>>1$$

$$n=(M+h)>>1$$

$$f=(b+j)>>1$$

$$i=(h+j)>>1$$

$$k=(j+m)>>1$$

$$q=(j+s)>>1 \quad (7)$$

Meanwhile, the pixel-based values e, g, p, can be computed by a linear interpolation using only the pixel-based values b, h, m, s at ½-pixel accuracy, as given in the following equation.

$$e=(b+h)>>1$$

$$g=(b+m)>>1$$

$$p=(h+s)>>1 \quad (8)$$

Furthermore, the pixel-based value r is a point called "interpolatively challenging position" under the JVT coding scheme, which can be computed as in the following equation.

$$r=(G+H+M+N+2)>>2 \quad (9)$$

Figures 2, 3:
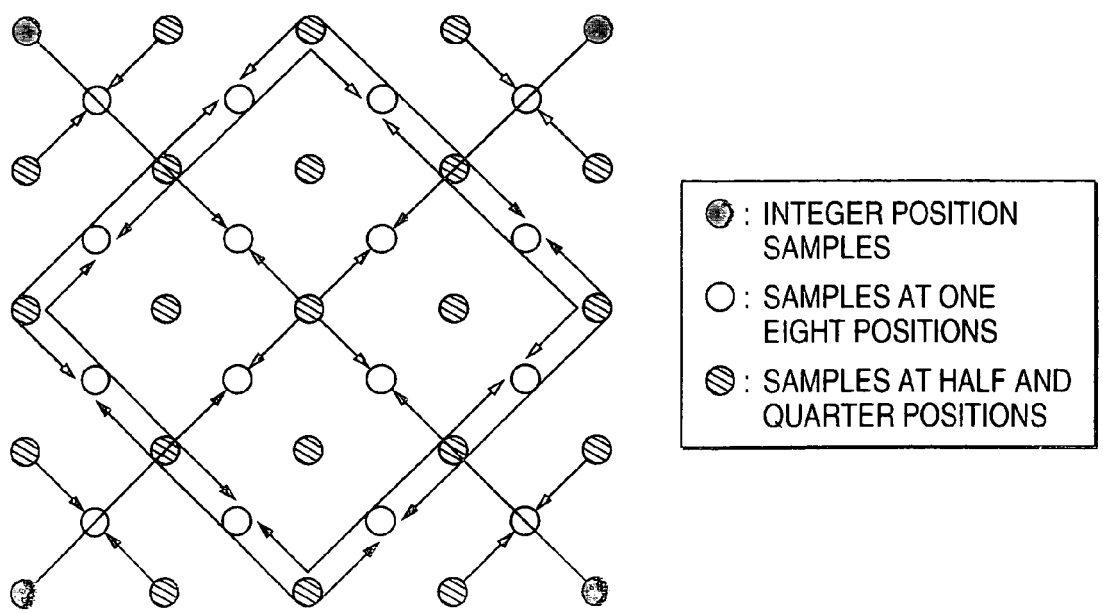
FIG. 2 is a schematic diagram for explaining the motion compensation at ⅛-pixel accuracy under the JVT coding scheme.
FIG. 3 is a schematic diagram showing the motion compensation at ⅛-pixel accuracy using pixel-based values on a diagonal line.

Now, the motion compensating process at ⅛-pixel accuracy (interpolation process) is explained with using FIG. 2.

Under the JVT coding scheme, the following equation is defined as a polyphenol filter coefficient to generate a pixel-based value (luminance signal) at ¼-pixel accuracy.

$$(-3,12,-37,229,71,-21,6,-1)$$

$$(-3,12,-39,158,158,-39,12,-3)$$

$$(1-,6,-21,71,229,-37,12,-3) \quad (10)$$

Concerning the pixel-based values $b^h$, $b^v$ at ¼-pixel accuracy, the filter coefficients in Equation (10) are used to make a sum-of-products operation with a pixel-based value A at integer-pixel accuracy as an input sample. Thereafter, a clip process is made according to the following equation, thereby carrying out computation.

$$b^{h,v}=\text{Clip1}(b+128)>>8 \quad (11)$$

Meanwhile, concerning the pixel-based value $c^m$, $c^q$, a sum-of-products operation is first carried out on the pixel-based value $b^h$, $b^v$. Then, using a value not to make a clip process, a sum-of-products operation is further made with the pixel-based value $b^h$, $b^v$ as an input. Thereafter, a clip process is made according to the following equation, thereby carrying out computation.

$$c^{m,q}=\text{Clip1}(c+32768)>>16 \quad (12)$$

Meanwhile, the pixel-based value d at ⅛-pixel accuracy can be computed depending upon its position by a linear interpolation according to the following equation.

$$d=(A+b^h)>>1$$

$$d=(A+b^v)>>1$$

$$d=(b^h+c^q)>>1$$

$$d=(b^v+c^q)>>1$$

$$d=(c^q+c^q)>>1$$

$$d=(b^v+b^v)>>1$$

$$d=(c^q+c^m)>>1 \quad (13)$$

Meanwhile, the pixel-based value e can be computed by using the pixel-based value $b^h$, $b^v$ positioned on a diagonal line, according to the following equation.

$$e=(b^h+b^v)>>1 \quad (14)$$

Meanwhile, the pixel-based value g can be computed according to the following equation.

$$g=(A+3c^m+2)>>2 \quad (15)$$

Furthermore, the pixel-based values $f^h$, $f^v$ can be computed by the following equations.

$$f^h=(3b^h+b^v+2)>>2$$

$$f^v=(3b^v+b^h+2)>>2 \quad (16)$$

Herein, FIG. 3 shows a concept figure on the technique to generate a pixel-based value at ⅛-pixel accuracy by linear interpolation using a pixel-based value existing on the diagonal line.

Figure 4:
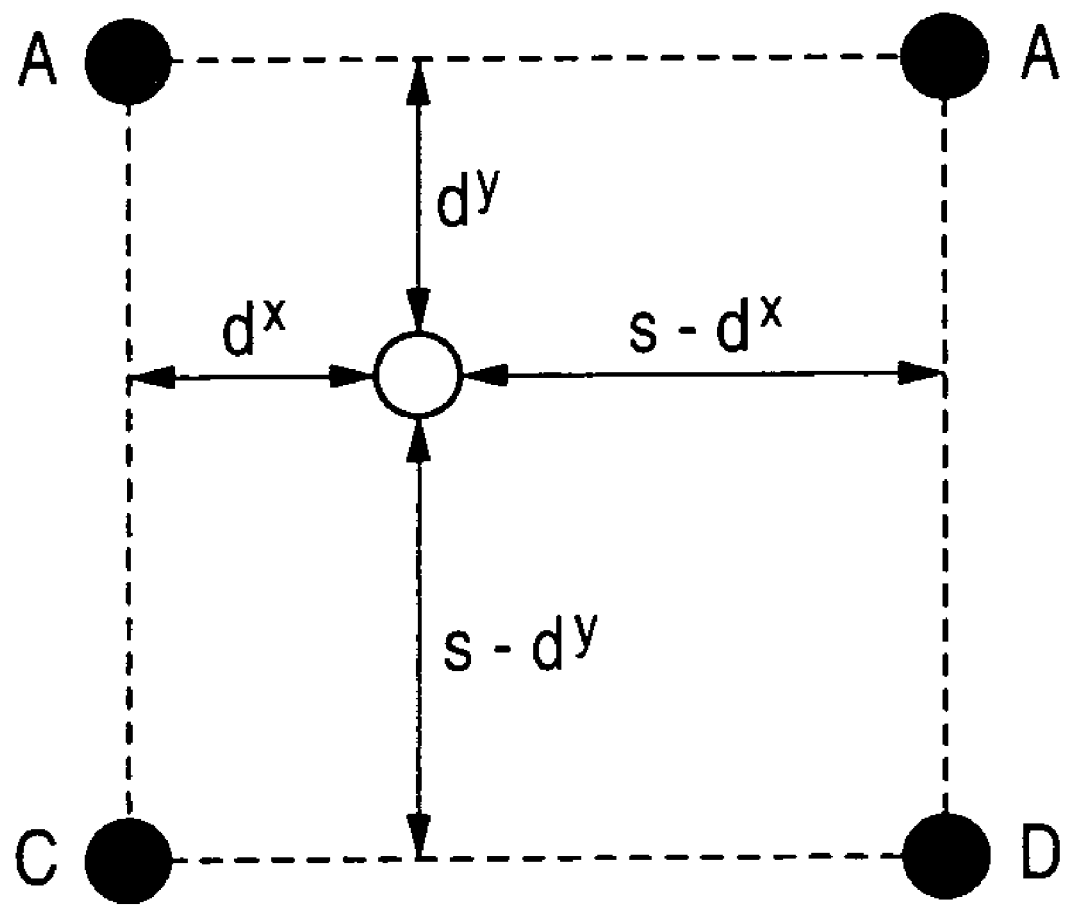
FIG. 4 is a schematic diagram for explaining the motion compensation in chrominance signals.

Now, explained is the motion compensating process (interpolation process) of a chrominance signal under the JVT coding scheme, by using FIG. 4. Under the JVT coding scheme, in both cases of compensation for a motion at ¼-pixel accuracy, and motion at ⅛-pixel accuracy, the chrominance signal at decimal-pixel accuracy can be computed by linear interpolation according to the following equation.

$$v=\frac{(s-d^x)(s-d^y)A+d^x(s-d^y)B+(s-d^x)d^yC+d^xd^yD+S^2/2}{s^2} \quad (17)$$

Meanwhile, there are a number of motion compensating processes defined under the JVT scheme, as described above. It is important, in generating image compression information at high compression ratio, to select an optimal one of the relevant modes for the macro-block, i.e., to search for a motion vector. For this reason, a motion vector is searched for by RD optimization.

Now, such RD optimization is explained in detail.

In RD optimization, provided that the search result is J(m, $\lambda_{MOTION}$), the motion vector is m=$(m_x, m_y)^r$, the predictive motion vector is SA(T)D(s, c(m)), p=$(p_x, p_y)^r$, the Lagrange multiplier for the motion vector is $\lambda_{MOTION}$, and the generated information amount of a motion vector difference determined by a generation code amount table is R(m−p), then the motion search at every pixel accuracy in motion compensation can be determined according to the following equation.

$$J(m,\lambda_{MOTION})=SA(T)D(s,c(m))+\lambda_{MOTION}\cdot R(m-p) \quad (18)$$

Herein, under the JVT coding scheme, there are defined two kinds of entropy coding, i.e., the method based on UVLC (Universal Variable Length Coding) and the method based on CABAC (Context-based Adaptive Binary Arithmetic Coding). For the generated information amount, UVLC is applied even where CABAC is being applied. The residual energy (distortion) part of motion vector (corresponding to SA(T)D (s, c(m)) in Equation 18) can be determined by the following equation, provided that the current-frame image signal is s and the reference-frame image signal is c.

$$SAD(s,c(m))=\sum_{X=1,Y\cdots 1}^{B,B}|s[x,y]-c[x-m_x,y-m_y]| \quad (19)$$

Note that, when correcting a motion vector at half-pixel accuracy or lower, SATD is used because determination is possible by the use of a Hadamard transform instead of a discrete cosine transform.

The Lagrange multiplier ($\lambda_{MOTION}$), provided that the quantization parameter is QP, for the I and P frames is given as in the following equation.

$$\lambda_{MODE,P}=\sqrt{0.85*2^{QP/3}} \quad (20)$$

Meanwhile, for the B frame is given as in the following equation.

$$\lambda_{MODE,B}=\sqrt{4*0.85*2^{QP/3}} \quad (21)$$

Figure 17:
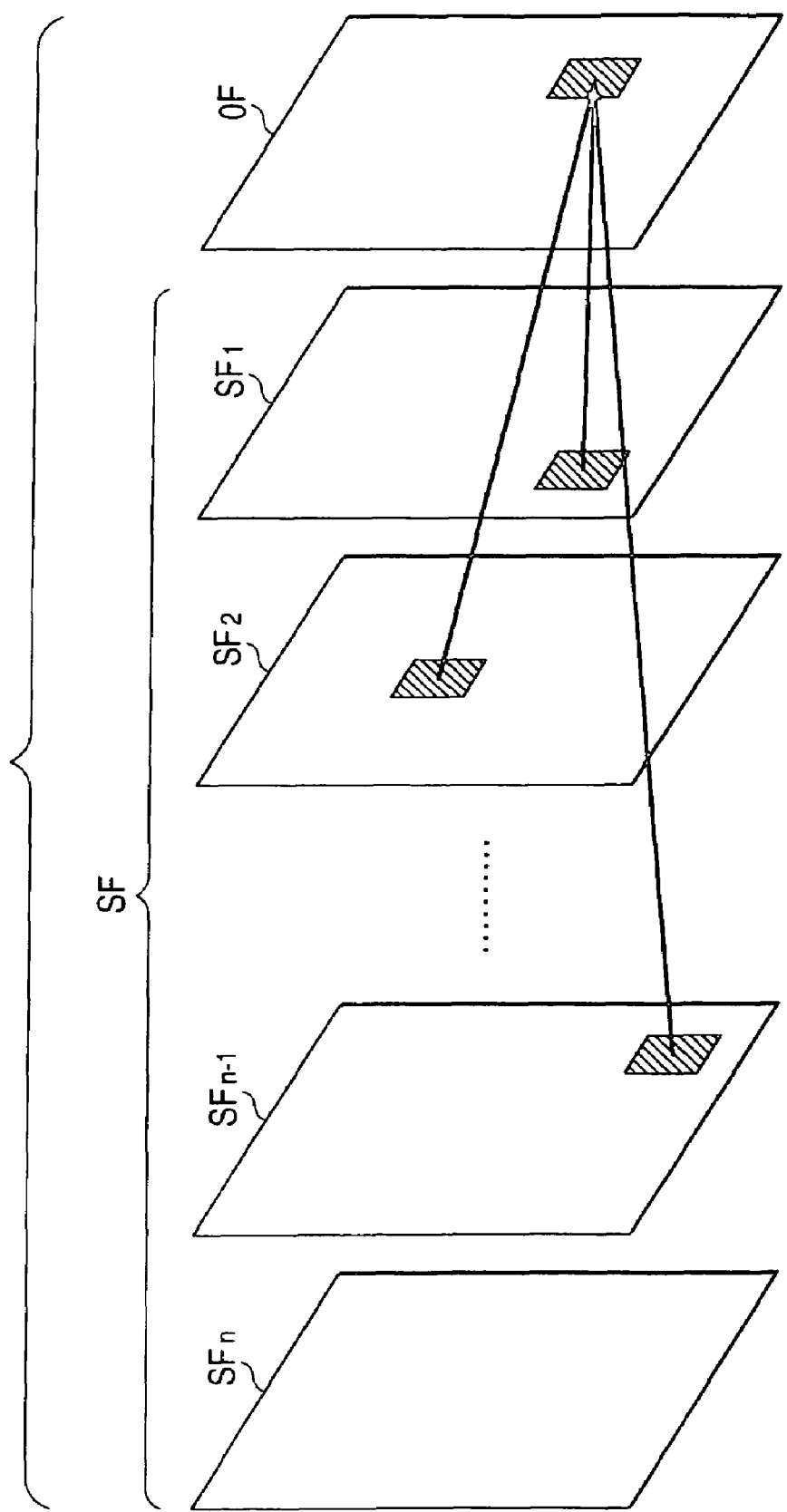
FIG. 17 is a schematic diagram for explaining a Multiple Reference Frame as defined under the JVT coding scheme.

Now, explained is the case of selecting a reference frame image to be actually referred from a group SF of a plurality of reference frame images (FIG. 17) in RD optimization. In RD optimization, provided that, concerning selecting a reference frame image, the result of that selection is J(REF|$\lambda_{MOTION}$) and the value the amount of generated information on the reference frame is determined by UVLC is R(REF), selected is a reference frame image having a value at which the relevant selection result (J(REF|$\lambda_{MOTION}$)) assumes a minimum according to the following equation.

$$J(REF/\lambda_{MOTION}) = SATD(s, c(REF, m(REF) + \lambda_{MOTION} \cdot \quad (22)$$
$$(R(m(REF) - p(REF)) + R(REF))$$

Meanwhile, concerning to select a predictive direction of N×M blocks in the B frame, provided that the result of that selection is J(PDIR|$\lambda_{MOTION}$), selected is a predictive direction of N×M blocks having a value at which the relevant selection result (J(PDIR|$\lambda_{MOTION}$)) assumes a minimum according to the following equation.

$$J(PDIR/1_{MOTION}) = SATD(s, c(PDIR, m(PDIR)) + \quad (23)$$
$$1_{MOTION}(R(m(PDIR) - p(PDIR)) +$$
$$R(REF(PDIR)))$$

Now, explained is macro-block mode selection mentioned above in FIG. 16, in RD optimization. In RD optimization, provided that, concerning selecting a macro-block mode, the result of that selection is J(s, c, MODE|OP, $\lambda_{MOTION}$), selected is a macro-block mode having a value at which the relevant selection result (J(s, c, MODE|OP, $\lambda_{MOTION}$) ) assumes a minimum according to the following equation.

$$J(s, c, \mathrm{MODE}|QP, \lambda_{MOTION}) = SSD(s, c, \mathrm{MODE}|QP) + \quad (24)$$
$$\lambda_{MOTION} \cdot R(s, c, \mathrm{MODE}|QP)$$

The MODE, to assume a selection candidate for the macro-block mode, is shown based on each frame type in Table 1.

TABLE 1

Iframe: MODE ∈ {INTRA4×4, INTRA16×16,}

Pframe: MODE ∈ $\left\{\begin{array}{l}\mathrm{INTRA}4\times4, \mathrm{INTRA}16\times16,\\ 16\times16, 16\times8, 8\times16, 8\times8\end{array}\right\}$ Bframe: MODE ∈ $\left\{\begin{array}{l}\mathrm{INTRA}4\times4, \mathrm{INTRA}16\times16, \mathrm{DIRECT},\\ 16\times16, 16\times8, 8\times16, 8\times8\end{array}\right\}$ In Table 1, "SKIP" has a size of vertical/horizontal 16×16 pixels and represents vector residues and those having coefficient residues not to be sent toward the decode side. "SSD" is a value of error sum of squares represented by the following equation provided that the macro-block generated information amount when MODE and QP are selected is R(s, c, MODE|QP), the luminance components of the re-configured and original images are $c_y[x, y, \mathrm{MODE}|QP]$ and $s_y[x, y]$, and the chrominance components are $c_u$, $c_v$, and $s_u$, $s_v$.

$$SSD(s, c, \mathrm{MODE}|QP) = \sum_{x=1, y=1}^{16, 16} (s_y \&x, y] - \quad (25)$$

-continued
$$c_y[x, y, \mathrm{MODE}|QP])^2 +$$
$$\sum_{x=1, y=1}^{8, 8} (s_U[x, y] -$$
$$c_U[x, y, \mathrm{MODE}|QP])^2 +$$
$$\sum_{x=1, y=1}^{8, 8} (s_V[x, y] -$$
$$c_V[x, y, \mathrm{MODE}|QP])^2$$

Note that the amount of generated information includes that corresponding to all the pieces of information, such as headers, motion vectors and orthogonal transform coefficients. Meanwhile, the Lagrange multiplier ($\lambda_{MOTION}$) is provided as in the Equations (20) and (21).

Figure 16:
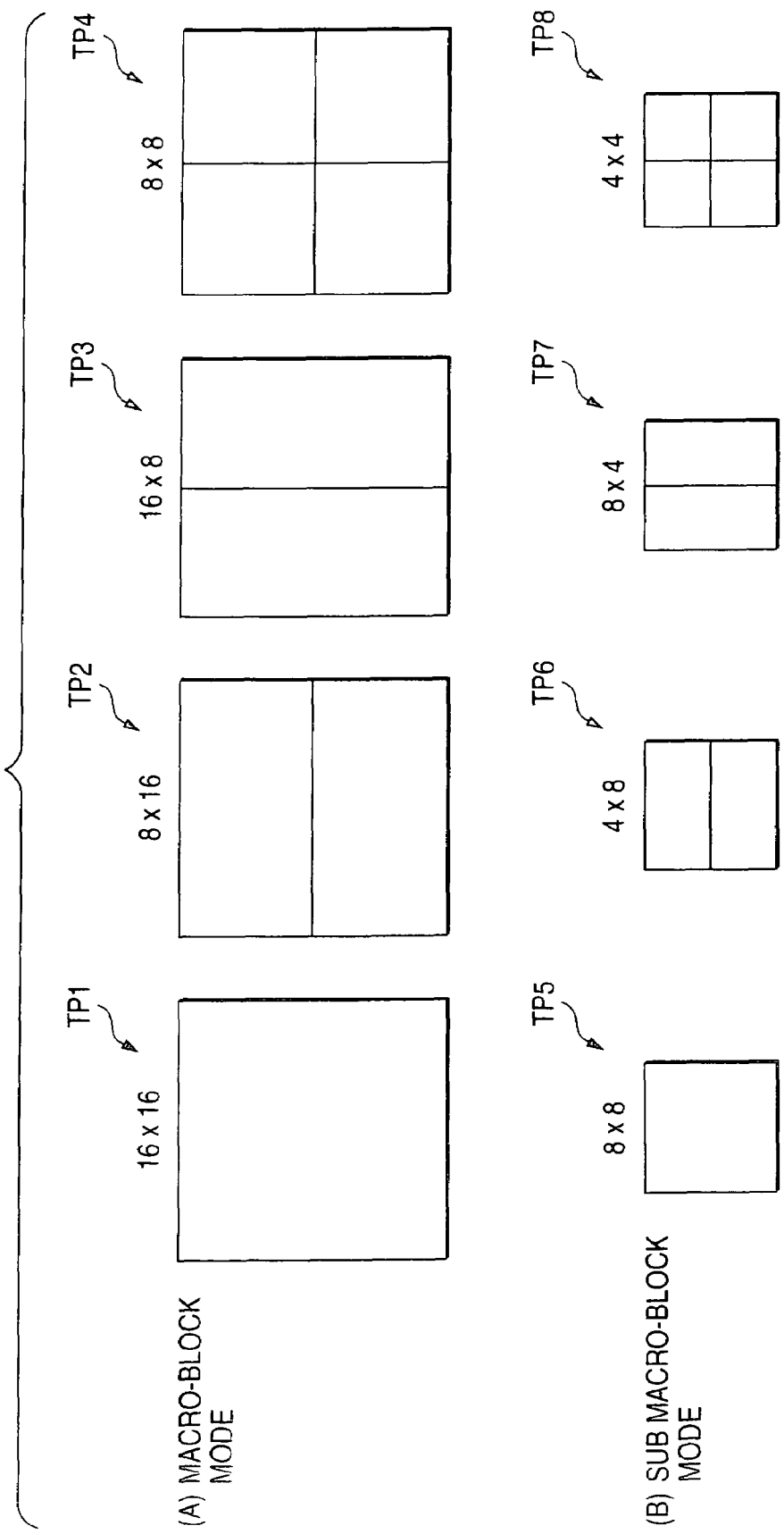
FIG. 16 is a schematic diagram showing a motion compensating block as defined under the JVT coding scheme.

The sub-macro block mode mentioned in FIG. 16 is selection-processed similarly to the case on the macro-block mode. The MODE, to assume a selection candidate for the sub-macro block mode, is shown based on each frame type in Table 2.

TABLE 2

Pframe: MODE ∈ $\left\{\begin{array}{l}\mathrm{INTRA}4\times4,\\ 8\times8, 8\times4, 4\times8, 4\times4\end{array}\right\}$ Bframe: MODE ∈ $\left\{\begin{array}{l}\mathrm{INTRA}4\times4, \mathrm{DIRECT},\\ 8\times8, 8\times4, 4\times8, 4\times4\end{array}\right\}$ In case the foregoing processes as defined under the JVT coding scheme be applied to the image coding apparatus, a huge amount of operation is needed upon searching for motion vectors. Accordingly, the present invention reduces the amount of operation possibly without losing the compression efficiency.

Now, one embodiment of the present invention is described in detail with reference to the drawings.

Image Coding Apparatus Configuration

Figure 5:
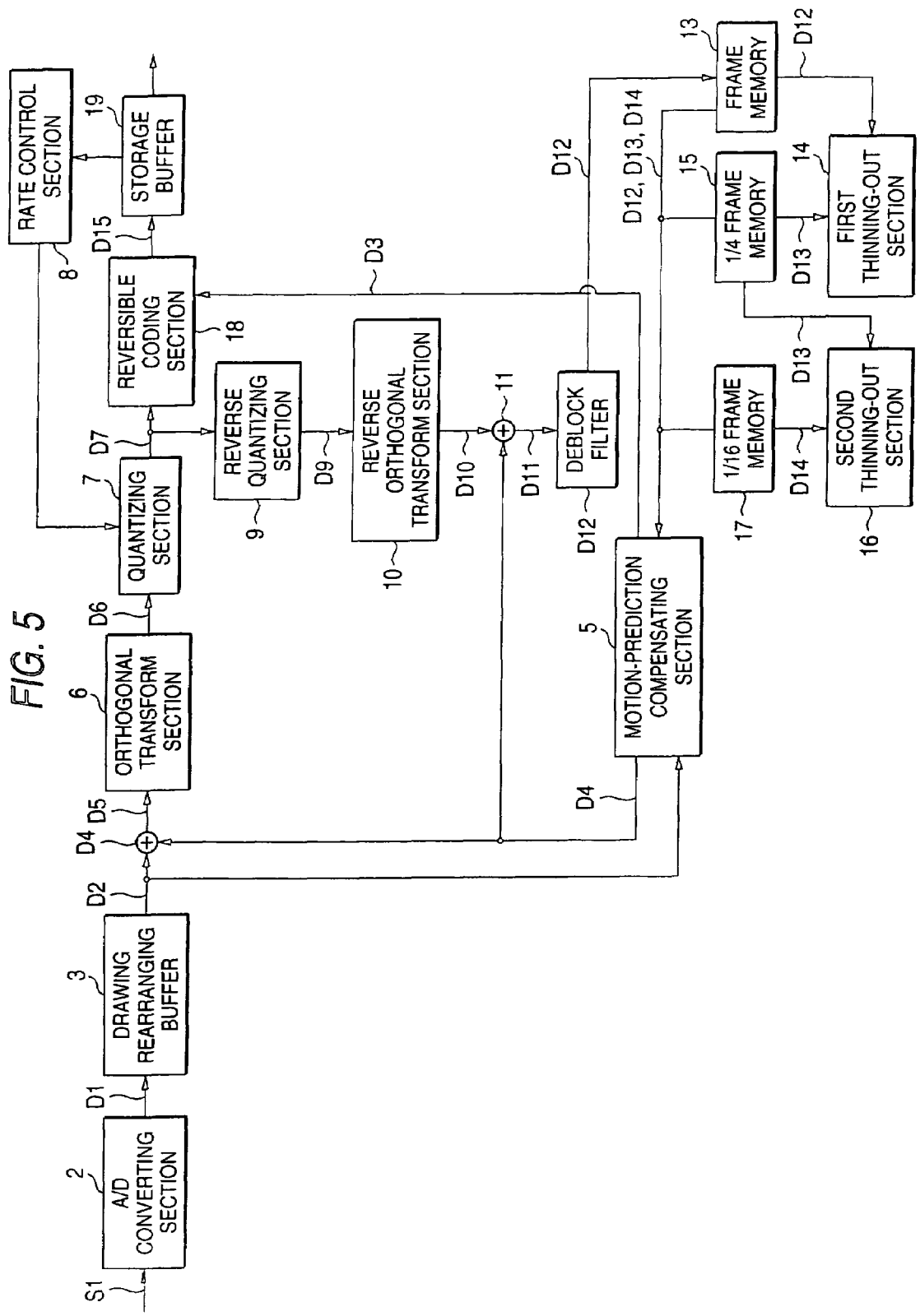
FIG. 5 is a block diagram showing a configuration of an image coding apparatus according to the present invention.

FIG. 5 is a block diagram of the overall configuration of an image coding apparatus 1 to which the JVT coding scheme is applied.

In the image coding apparatus 1, the motion image signal S1 supplied from an external source is generated into motion image data D1 through an A/D converting section 2, followed by being temporarily stored in an image rearranging buffer 3. In the image rearranging buffer 3, the motion image data D1 are rearranged in a compression-coding order on a frame-image unit basis. The rearranged frame images are sequentially forwarded as frame data D2 to an adder 4 and motion-prediction compensating section 5.

The motion-prediction compensating section 5, although detailed later, divides the frame image of the frame data D2 provided from the image rearranging buffer 3 into motion compensating blocks having a size of vertical/horizontal 16×16 pixels, the greatest pixel-based size of the motion-compensating blocks mentioned in FIG. 16 (hereinafter, this is referred to as the maximum motion-compensating block). Based on each maximum motion-compensating block, optimal motion vectors D3 are respectively detected by using a plurality of reference frame images while sequentially changing the pixel-based size of the motion-compensating block. These are sequentially forwarded to a reversible coding apparatus 18.

Meanwhile, the motion-prediction compensating section 5 sequentially forwards to the adders 4 and 11 a plurality of predictive data D4 obtained by compensating for motion according to a plurality of motion vectors D3.

In the case that predictive data D4 is provided from the motion-prediction compensating section 5, the adder 4 subtracts a plurality of predictive data D4 corresponding to the relevant frame data D2 from the respective frame data D2 (image type other than I picture) supplied from the image rearranging buffer 6, thereby generating difference data D5 and forwarding them to an orthogonal transform section 6.

On the contrary, when predictive data D4 is not provided, the adder 4 forwards the frame data D2 (I picture) provided from the image rearranging buffer 6, as difference data as they are, to the orthogonal transform section 6.

The orthogonal transform section 6 carries out an orthogonal transform process, such as discrete cosine transform, on the difference data D5 to thereby generate orthogonal transform coefficient data D6, and forwards them to a quantizing section 7.

The quantizing section 7 carries out a quantizing process on the orthogonal transform coefficient data D6, to thereby generate quantized data D7 and forward them to the reverse quantizing section 9 and reversible coding section 18.

In this case, in the quantizing section 7, the quantization control data D8 for determining a quantization parameter value are provided under feedback control by a rate control section 8, thereby generating quantized data D7 in accordance with a quantization parameter value of the quantization control data D8.

The reversible coding section 18 carries out a reversible coding process conforming, for example, to UVCL on the quantized data D7 provided from the quantizing section 7 and the motion vector D3 provided from the motion-prediction compensating section 5, thereby generating coded data D15 and outputting them through a storage buffer 19.

On the other hand, the reverse quantizing section 9 carries out a reverse quantizing process on the quantized data D7 provided from the quantizing section 7, to thereby restore orthogonal transform coefficient data D9 corresponding to the orthogonal transform coefficient data D6 and forward them to the reverse orthogonal transform section 10.

The reverse orthogonal transform section 10 carries out a reverse orthogonal transform process on the orthogonal transform coefficient data D9 provided from the reverse quantizing section 9, to thereby restore difference data D10 corresponding to the difference data D5 and forward them to an adder 11.

The adder 11, when provided predictive data D4 from the motion-prediction compensating section 5, adds a plurality of predictive data D4 corresponding to the relevant difference data D10 to the difference data D10 provided by the reverse orthogonal transform section 11, thereby restoring frame data D11 corresponding to the frame data D2 and forwarding them to a deblock filter 12.

On the contrary, the adder 11, when not provided motion compensating data D4 from the motion-prediction compensating section 5, forwards the difference data D10 provided from the reverse orthogonal transform section 11, as frame data D11 as they are, to the deblock filter 12.

The deblock filter 12, when a distortion is caused between adjacent macro-blocks of among the frame data D11 provided from the adder 11, smoothens the relevant distorted part by filtering and stores, as required, the smoothened frame data D11, as reference frame data D12 corresponding to one reference frame image, to a frame memory 13.

On the contrary, the deblock filter 12, when no distortion is caused between adjacent macro-blocks of among the frame data D11, stores as required the frame data D11, as reference frame data D12, to a frame memory 13.

In this manner, the image coding apparatus 1 is configured to store the reference frame data D12, in an amount of data corresponding to a plurality of reference frame images to be taken as reference candidates, to the frame memory 13.

In addition to the configuration, a first thinning-out section 14 thins out by a half horizontally vertically the pixels of a reference frame image of the reference frame data D12 read from the frame memory 13, thereby generating a size-reduced image having a ¼ reduction ratio with respect to the reference frame image as an original image (hereinafter, this is referred to as a ¼ size-reduced reference image) and storing it as first size-reduced data D13 to a ¼ frame memory 15.

In this case, the first thinning-out section 14 previously stores a FIR filter coefficient value defined in the foregoing Equation (1) in its internal memory (not shown). Using the FIR filter coefficient value, the pixels are thinned out according to a process similar to the motion-compensating process mentioned in FIG. 1. This can generate a ¼ size-reduced reference image.

Figure 6:
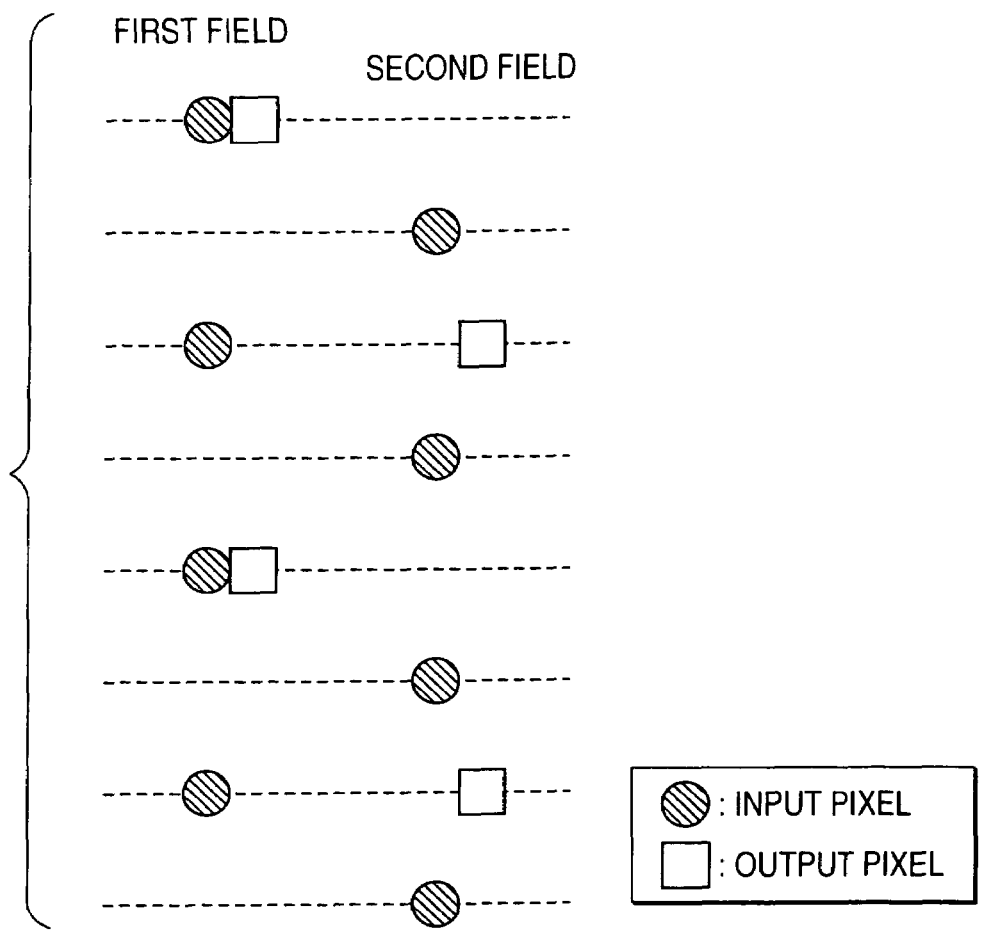
FIG. 6 is a schematic diagram for explaining a thinning-out process on a field.

Meanwhile, the first thinning-out section 14 is configured, when the reference frame data D12 is an interlaced operated image, to make a thinning-out every field with respect to a vertical direction as shown in FIG. 6. For the first field, filtering is made by the use of a filter coefficient value given by the following equation and previously stored in the internal memory.

$$\{-29,0,88,138,88,0,-29\}//256 \qquad (26)$$

For the second field, filtering is made by the use of a filter coefficient value given by the following equation previously stored in the internal memory.

$$\{1,7,7,1\}//16 \qquad (27)$$

Due to this, pixel thinning-out can be done every other of pixel-based values inputted.

A second thinning-out section 16 previously stores in its internal memory a FIR filter coefficient value defined in the foregoing Equations (1), (26) and (27). Similarly to the first thinning-out section 14, thinning out is made a half horizontally and vertically on the pixels of a ¼ size-reduced reference image of first size-reduced data D13 read out of the ¼ frame memory 15. Due to this, generated is a size-reduced image having a ¹⁄₁₆ reduction ratio (hereinafter, this is referred to as a ¹⁄₁₆ size-reduced reference image) with respect to the reference frame image as an original image. This is stored as second size-reduced reduced data D14 to the ¹⁄₁₆ frame memory 17.

In this manner, the image coding apparatus 1 generates ¼ size-reduced and ¹⁄₁₆ size-reduced images respectively having ¼ and ¹⁄₁₆ reduction ratios on a plurality of reference frame images corresponding to a plurality of ones of frame data D12 stored in the frame memory 13, in the number corresponding respectively to the plurality of reference frame images. These are stored to the corresponding ¼ frame memory 15 or ¹⁄₁₆ frame memory 17.

Motion-Prediction Compensating Section Configuration

Now, explanation is made on the configuration of the motion-prediction compensating section to which the invention is applied.

Figure 7:
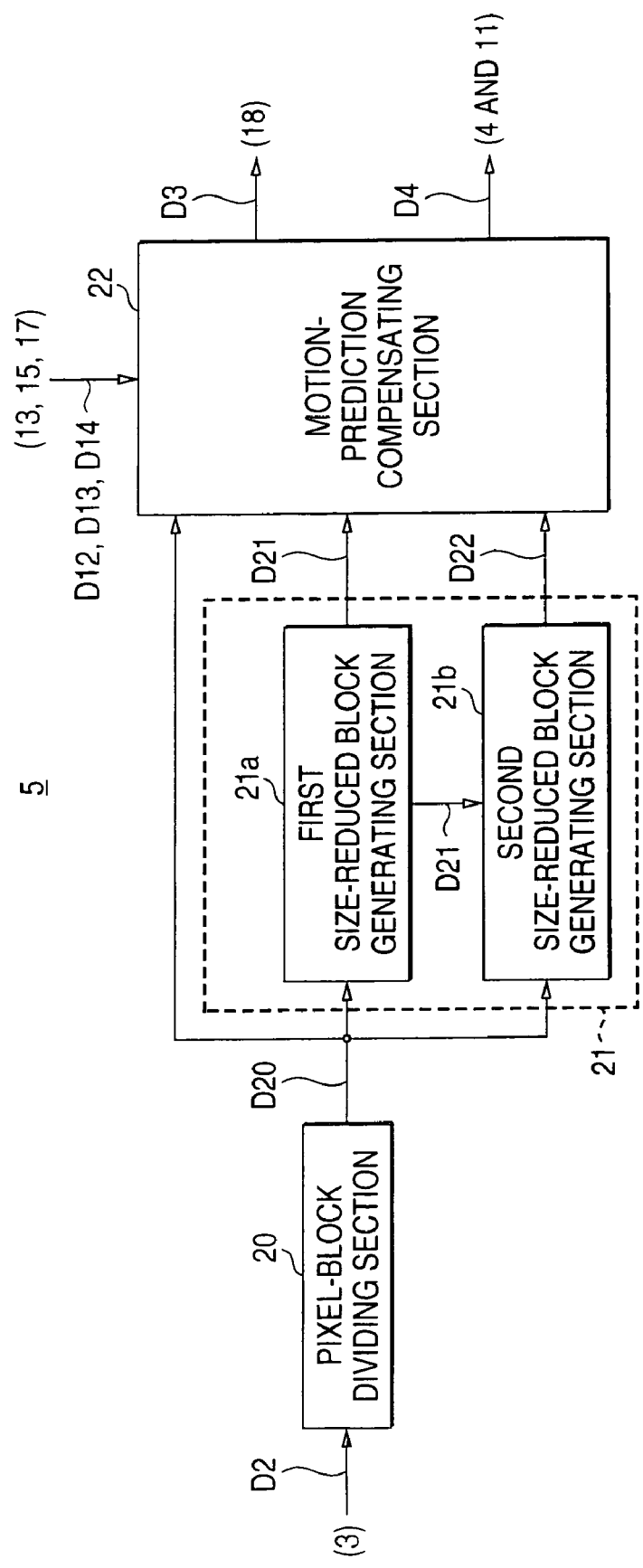
FIG. 7 is a block diagram showing a configuration of a motion-prediction compensating section.

As shown in FIG. 7, the motion-prediction compensating section 5 as a motion-prediction compensating apparatus is configured by a pixel-block dividing section 20, a size-reduced block generating section 21 as hierarchizing means, and a motion-prediction compensating section 22 as search-range determining means and detecting means, to input the frame data D2 provided from the image rearranging buffer 3 to the pixel-block dividing section 20.

The pixel-block dividing section 20 divides the frame image of the frame data D2, based on the block unit having a vertical horizontal 16×16 pixel-based size to thereby generate a plurality of maximum motion compensation blocks, and sequentially forwards the maximum motion compensating blocks as maximum motion compensating block data D20 to the size-reduced block generating section 21 and motion-prediction compensating section 22.

The first size-reduced block generating section 21a of the size-reduced block generating section 21 previously stores a FIR filter coefficient value as defined in the foregoing Equations (1), (26) and (27) in its internal memory (not shown), and carries out a similar process to the first thinning-out section (FIG. 5) thereby thinning out the pixels.

In this case, the first size-reduced block generating section 21a horizontally vertically thins out a half the pixels of the maximum motion compensating block of the maximum motion compensating block data D20 to thereby generate a block having a size of vertical/horizontal 8×8 pixels with a ¼ size-reduction ratio (hereinafter, this is referred to as a ¼ size-reduced block) on the maximum motion compensating block having a size of vertical/horizontal 16×16 pixels, and forwards it as ¼ size-reduced block data D21 to a second size-reduced block generating section 21b and motion-prediction compensating section 22.

The second size-reduced block generating section 21b previously stores a FIR filter coefficient value as defined in the foregoing Equations (1), (26) and (27) in its internal memory (not shown), and carries out a similar process to the second thinning-out section (FIG. 5) thereby thinning out the pixels.

In this case, the second size-reduced block generating section 21b horizontally vertically thins out a half the pixels of the ¼ size-reduced block of the ¼ size-reduced block data D21 to thereby generate a block having a size of vertical/horizontal 4×4 pixels with a ¹⁄₁₆ size-reduced ratio (hereinafter, this is referred to as a ¹⁄₁₆ size-reduced block) on the maximum motion compensating block having a size of vertically horizontally 16×16 pixels, and forwards it as ¹⁄₁₆ size-reduced block data D22 to the motion-prediction compensating section 22.

Figure 8:
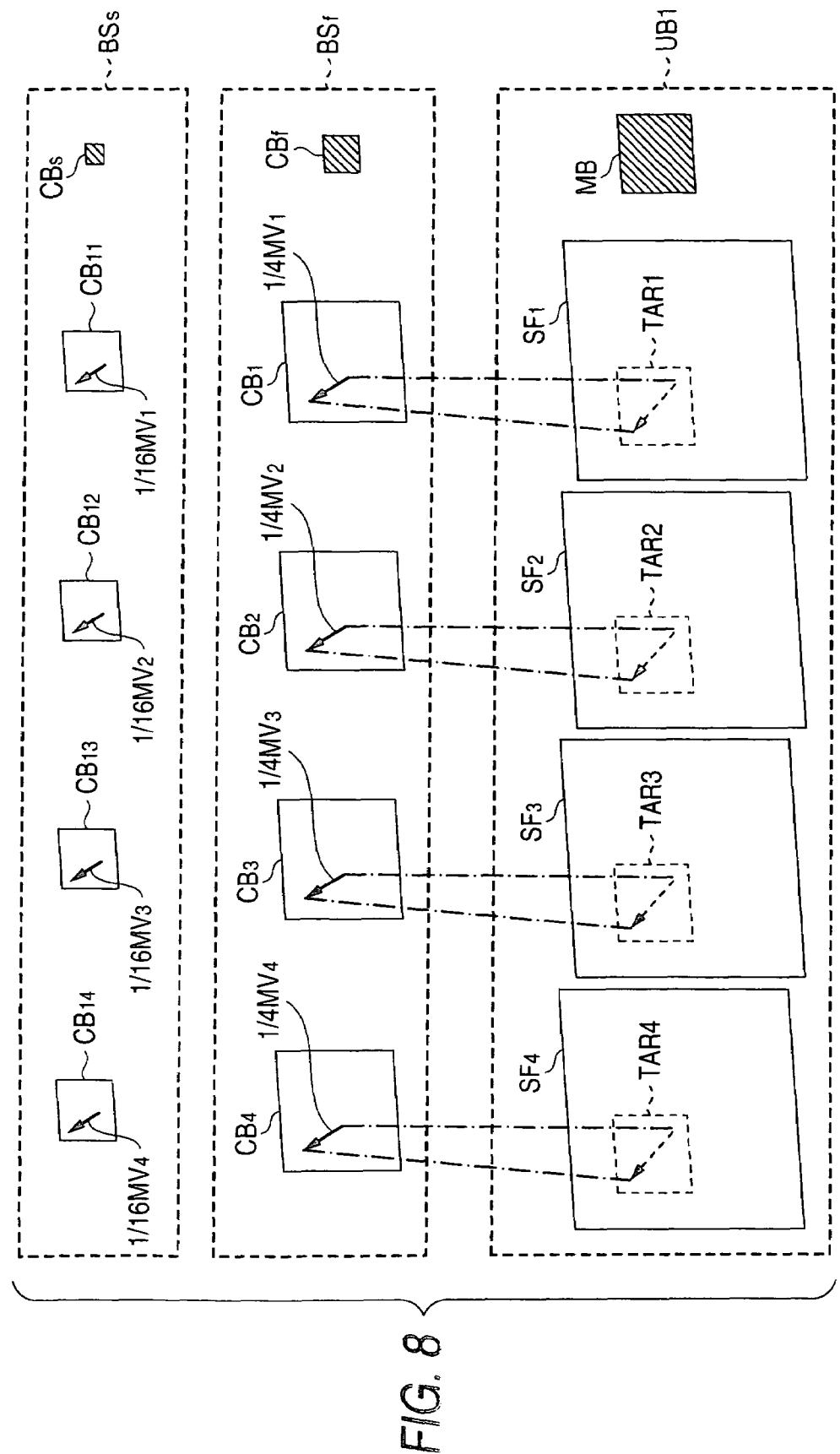
FIG. 8 is a schematic diagram showing a manner of hierarchization.

The motion-prediction compensating section 22 recognizes, as an original image group on the uppermost layer TS, the maximum motion compensating block UB1 corresponding to the maximum motion compensation block data D20 provided from the pixel-block dividing section 20 and the reference frame images SF1-SF4 corresponding to, for example, four kinds of reference frame data D12 read out of the frame memory 13, as shown in FIG. 8.

Meanwhile, the motion-prediction compensating section 22 recognizes, as a size-reduced image group on the first lower layer BSf, the ¼ size-reduced block CBf corresponding to the ¼ size-reduced block data D21 provided from the first size-reduced block generating section 21a and the ¼ size-reduced reference frame images CB1-CB4 corresponding to, for example, four kinds of first size-reduced image data D13 read out of the ¼ frame memory 15.

Furthermore, the motion-prediction compensating section 22 recognizes, as a size-reduced image group on the lowermost second layer BSs, the ¹⁄₁₆ size-reduced block CBs corresponding to the ¹⁄₁₆ size-reduced block data D22 provided from the second size-reduced block generating section 21b and the ¹⁄₁₆ size-reduced reference frame images CB11-CB14 corresponding to the second size-reduced image data D14 read out of the ¹⁄₁₆ frame memory 17.

Thus, the motion-prediction compensating section 22 carries out a motion-prediction compensating process by the use of the recognized image groups of the uppermost layer TS, first lower layer BSf and second lower layer BSs to thereby generate a motion vector D3 and predictive data D4, and forwards the motion vector D3 to the reversible coding section 18 and the predictive data D4 to the adders 4 and 11.

In this manner, the motion-prediction compensating section 5 carries out a motion-prediction compensating process with separation to the hierarchical layers TS, BSf and BSs, by taking a set of the maximum motion compensating block UB1, ¼ size-reduced block CBf and ¹⁄₁₆ size-reduced block CBs and the reference frame image SF1-SF4, ¼ size-reduced reference image CB1-CB4 and ¹⁄₁₆ size-reduced reference image CB11-CB14 respectively corresponding to the reduction ratios of the maximum motion compensating block UB1, ¼ size-reduced block CBf and ¹⁄₁₆ size-reduced block CBs.

Meanwhile, the motion-prediction compensating section 22 is configured to carry out a motion-prediction compensating process by a control section configured by a not-shown CPU, ROM, RAM and the like, according to a predetermined motion-prediction compensating program previously stored in the ROM. The motion-prediction compensating process procedure is explained below.

Motion-Prediction Compensating Process Procedure

Figure 9:
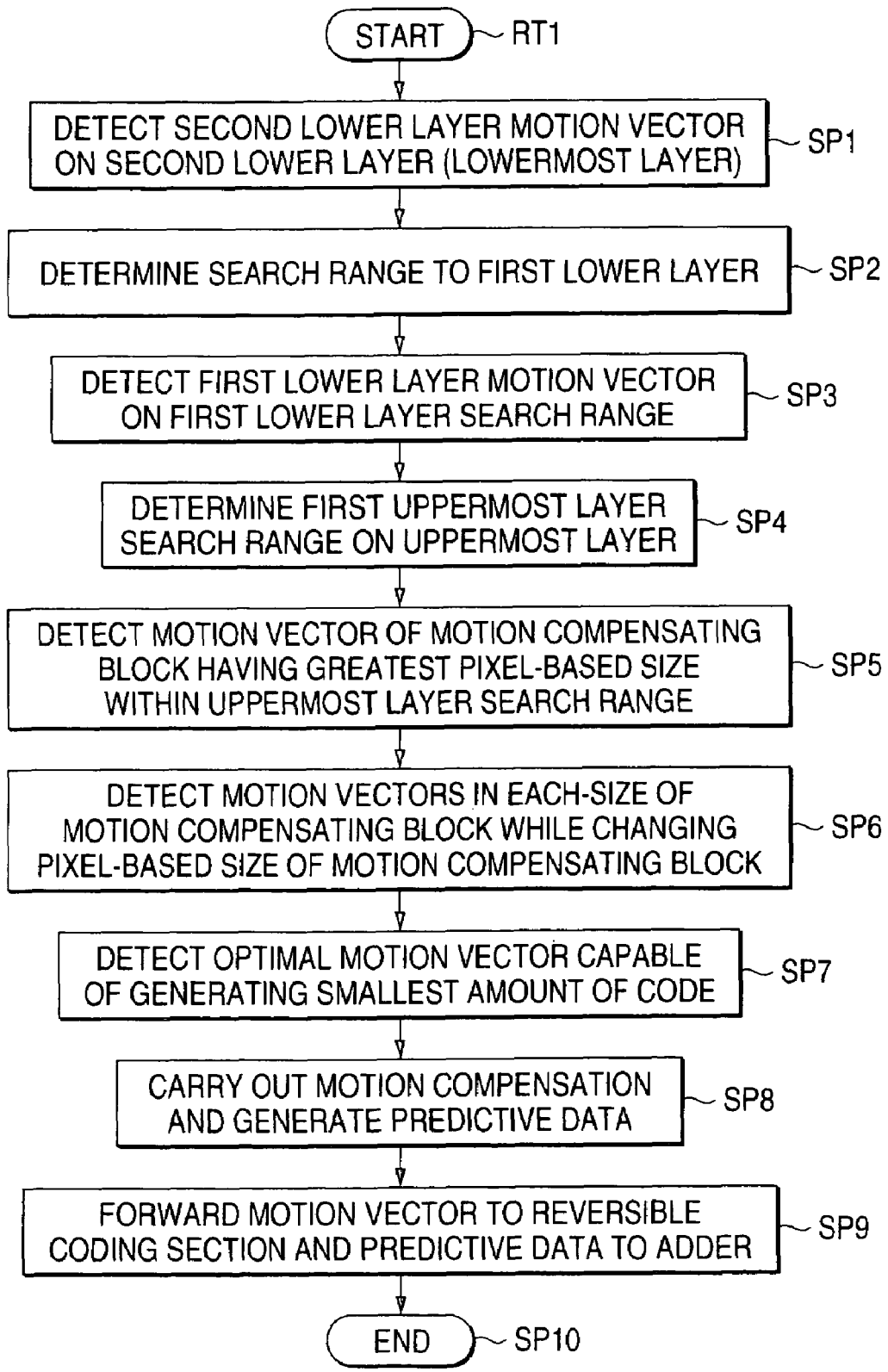
FIG. 9 is a flowchart showing a motion-prediction compensating process procedure.

As shown in FIG. 9, the motion-prediction compensating section 22 moves from the start step of a routine RT1 to the following step SP1, to sequentially make a block matching on the respective ones of ¹⁄₁₆ size-reduced reference images CB11-CB14 on the lowermost, second lower layer BSs (FIG. 8) with a ¹⁄₁₆ size-reduced block CBs having a size of vertical/horizontal 4×4 pixels, thereby searching for a motion vector on the second lower layer BSs (hereinafter, this is referred to as a second lower layer motion vector).

Figure 10:
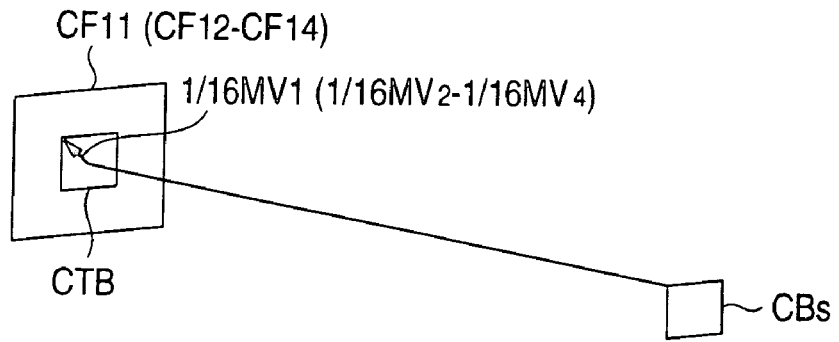
FIG. 10 is a schematic diagram for explaining an example to search for a motion vector.

Specifically, the motion-prediction compensating section 22 determines only the absolute-value total sums of differences between every pixel-based value within the ¹⁄₁₆ size-reduced block CBs and the pixel-based value of a block within the ¹⁄₁₆ size-reduced reference image CB11 (CB12-CB14) corresponding to that block CBs (hereinafter, this is referred to as a corresponding block) without applying RD optimization, for example, as shown in FIG. 10. Based on a motion amount between the corresponding block CTB of among those the absolute-value total sum assumes the minimum and the ¹⁄₁₆ size-reduced block CBs, detected is a second lower layer motion vector ¹⁄₁₆MV1 (¹⁄₁₆MV2-¹⁄₁₆MV4) on the second lower layer BSs (FIG. 8). Then, the process moves to the next step SP2.

In this case, the motion-prediction compensating section 22 makes a block matching on the ¹⁄₁₆ size-reduced reference image CB11-CB14 smaller in search range as compared to the reference frame image SF1-SF4 as an original image without making reference to a generation code amount table representative of a generation code amount of a motion vector difference and without carrying out an operation of quantizing function (Lagrange multiplier on the motion vector). This can reduce the process burden upon determining the second lower layer motion vectors ¹⁄₁₆MV1-¹⁄₁₆MV4.

Figure 11:
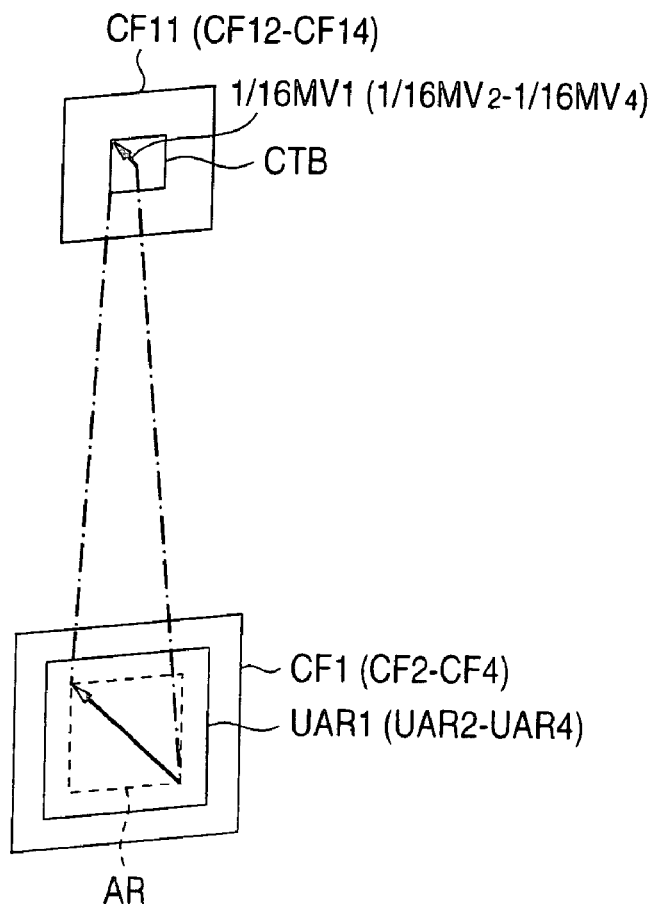
FIG. 11 is a schematic diagram for explaining a first determining example on a motion vector search range.

In the step SP2, the motion-prediction compensating section 22 makes a motion compensation process (interpolation process) on the horizontal and vertical components of the second lower layer motion vector ⅟₁₆MV1-⅟₁₆MV4 detected in the step SP1 as shown for example in FIG. 11, thereby enlarging the horizontal component twice and the vertical component twice, i.e. four times in total.

In this case, the motion-prediction compensating section 22, even when the ¼-pixel accuracy (FIG. 1) or ⅛-pixel accuracy (FIG. 2) under the JVT coding scheme is selected for the maximum motion compensating block UB1 on an original image corresponding to the ⅟₁₆ size-reduced block CBs, makes a motion compensation according to an integer-pixel accuracy or ½-pixel accuracy based on linear interpolation. This can reduce the process burden during the motion compensation.

The motion-prediction compensating section 22 determines the range UAR1 (UAR2-UAR4) including the peripheral several pixels in a rectangular range AR having apexes of start and end points of the second lower layer motion vector enlarged by the motion compensation, as a search range within a ¼ size-reduced reference image CB1 (CB2-CB4) on the first lower layer BSf (hereinafter, this is referred to as a first lower layer search range). The process moves to the next step SP3.

In the step SP3, the motion-prediction compensating section 22 sequentially makes a block matching on the first lower layer search ranges UAR1-UAR4 within the ¼ size-reduced reference images CB1-CB4 determined in the step SP2 with a ¼ size-reduced block CBf having a size of vertical/horizontal 8×8 pixels instead of applying RD optimization similarly to the process in the step SP1, thereby detecting motion vectors ¼MV1-¼MV4 (FIG. 8) (hereinafter, this is referred to as a first lower layer motion vector) in the first lower layer. The process moves to the next step SP4.

In the step SP4, the motion-prediction compensating section 22 carries out a similar process to the process in the step SP2 on the first lower layer motion vectors ¼MV1-¼MV4 detected in the step SP3, thereby determining a search range (hereinafter, this is referred to as an uppermost layer search range) TAR1-TAR4 within the reference frame image SF1-SF4 (FIG. 8) on the uppermost layer TS. The process moves to the next step SP5.

In the step SP5, the motion-prediction compensating section 22 sequentially makes a block matching by RD optimization on the first uppermost layer search ranges TAR1-TAR4 (FIG. 8) determined in step SP4, with a motion compensating block UB1 having a size of vertical/horizontal 16×16 pixels as defined under the JVT coding scheme, thereby detecting a motion vector related to the motion compensating block UB1. The process moves to the next step SP6.

In this case, the motion-prediction compensating section 22 searches only within the first uppermost layer search range TAR1-TAR4 and detects a motion vector related to the motion compensating block UB1 without searching for a motion vector throughout the entire maximum motion compensating block as defined under the JVT coding scheme, thereby making it possible to greatly reduce the process burden upon RD optimization requiring a huge operation amount as noted before.

Figure 12:
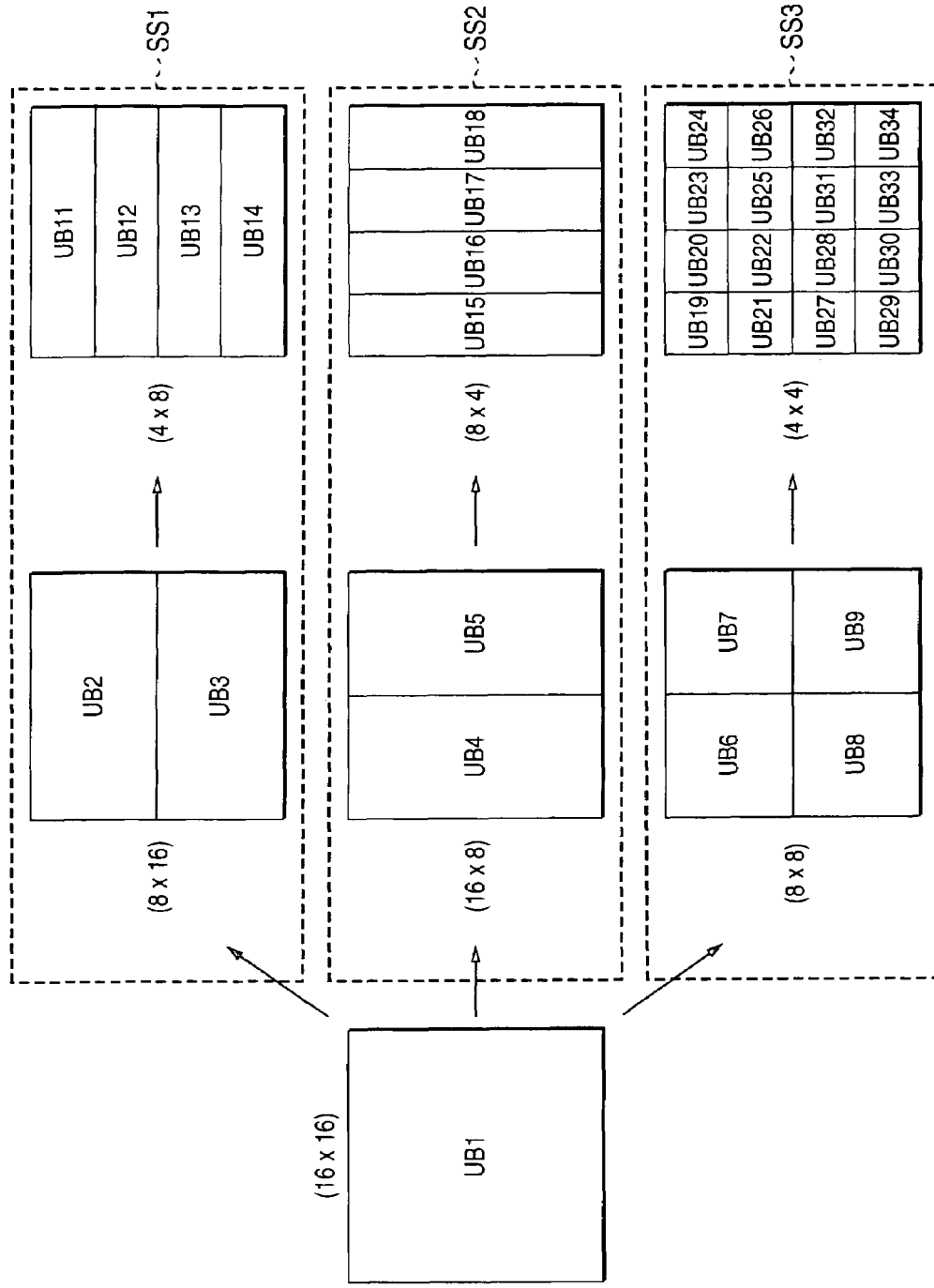
FIG. 12 is a schematic diagram for explaining a detecting sequence of motion vectors.

In step SP6, the motion-prediction compensating section 22 uses the first uppermost layer search range TAR1-TAR4 on the uppermost layer TS (FIG. 8), to carry out a block matching by RD optimization on each motion compensating block UB2-UB34 while sequentially changing from the greater pixel-based size to the smaller pixel-based size based on each of the first to third series SS1-SS3 whose motion compensating blocks are the same in block form as shown in FIG. 12.

Figure 13:
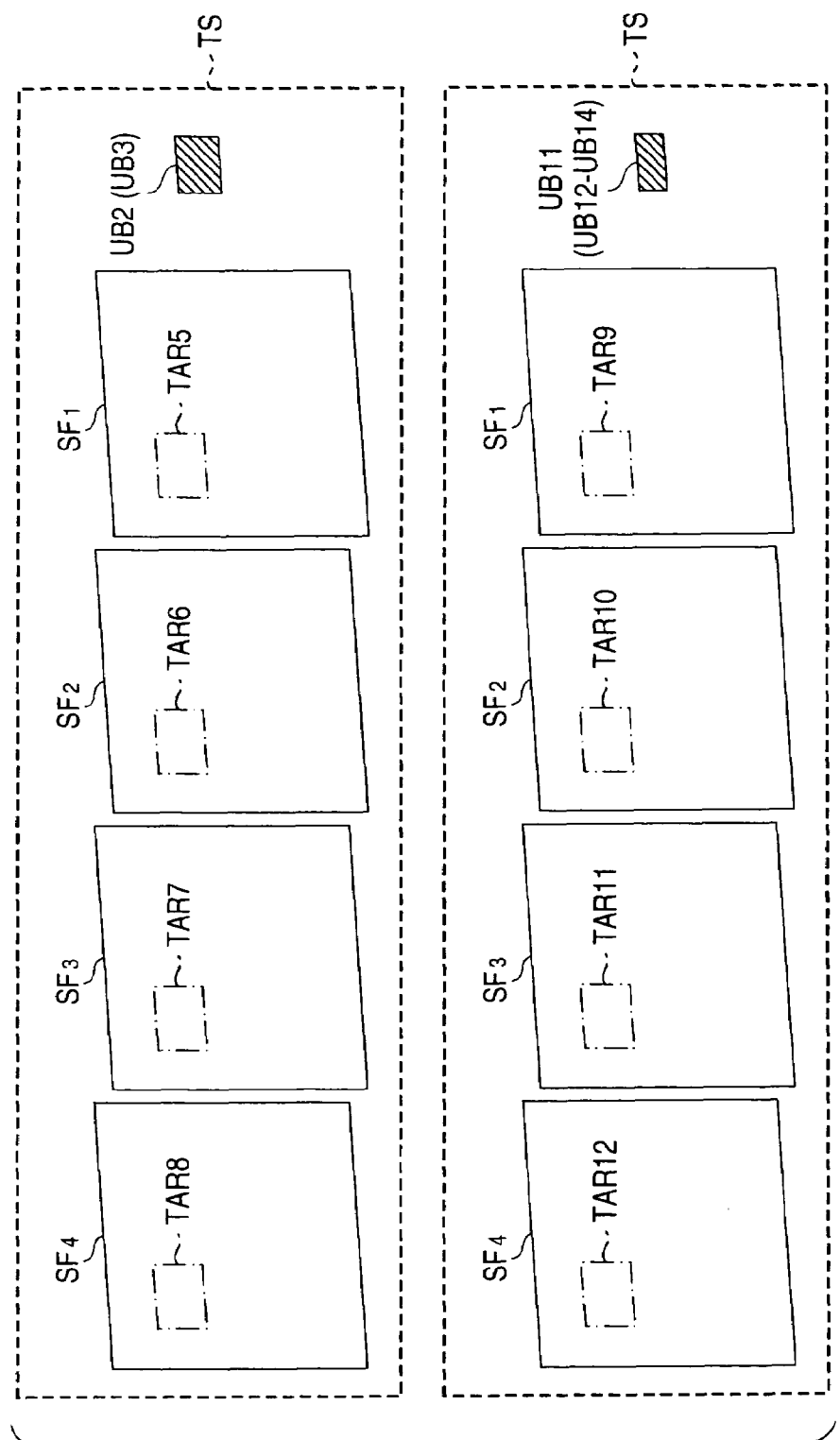
FIG. 13 is a schematic diagram for explaining a second determining example on a motion vector search range.

In actuality, the motion-prediction compensating section 22, in the first series SS1, carries out a similar process to the search range determination noted in FIG. 11 (hereinafter, this is referred to as a search range determining process) depending upon a motion vector of motion compensating block UB1 detected in the step SP5, to determine a second uppermost layer search range TAR5-TAR8 smaller than the first uppermost layer search range TAR1-TAR4 (FIG. 8) as shown, for example, in FIG. 13. Within only the relevant second upper most layer search range TAR5-TAR8, detected are two kinds of motion vectors related to the motion compensating blocks UB2 and UB3 each having a size of vertical/horizontal 8×16 pixels.

Then, the motion-prediction compensating section 22 carries out a search-range determining process depending upon a motion vector related to the motion compensating block UB2 and UB3, to determine a third uppermost layer search range TAR9-TAR12 smaller than the second uppermost layer search range TAR5-TAR8. Within only the relevant third uppermost layer search range TAR9-TAR12, detected are four kinds of motion vectors related to the motion compensating blocks UB11-UB14 each having a size of vertical/horizontal 4×8 pixels.

Meanwhile, the motion-prediction compensating section 22, in the second series SS2, detects two kinds of motion vectors related to the motion compensating blocks UB4 and UB5 each having a size of vertical/horizontal 16×8 pixels only within the second uppermost layer search range TAR5-TAR8 similarly to the process on the first series SS1, nearly simultaneously to the process on the first series SS1. Thereafter, within only the relevant third uppermost layer search range TAR9-TAR12, detected are four kinds of motion vectors related to the motion compensating blocks UB15-UB18 each having a size of vertical/horizontal 8×4 pixels.

Furthermore, the motion-prediction compensating section 22, in the third series SS3, detects four kinds of motion vectors related to the motion compensating blocks UB6-UB9 each having a size of vertical/horizontal 8×8 pixels only within the second uppermost layer search range TAR5-TAR8 similarly to the process on the first series SS1, nearly simultaneously to the process on the first series SS1. Thereafter, within only the relevant third uppermost layer search range TAR9-TAR12, detected are motion vectors related to the motion compensating blocks UB19-UB34 each having a size of vertical/horizontal 4×4 pixels.

In this manner, the motion-prediction compensating section 22 reduces its search range each time sequentially changing to a motion compensating block of a smaller pixel-based size, thereby making possible to reduce the process burden upon detecting a motion vector in a smaller pixel-based size of motion compensating block requiring a greater operation amount by an increase of the number of blocks as compared to a motion compensating block greater in pixel-based size. Furthermore, process burden can be greatly reduced as compared to the case of determining a motion vector in each pixel-based size of motion compensating block (FIG. 16) throughout the entire macro-block as defined under the JVT coding scheme.

In this manner, the motion-prediction compensating section 22 detects motion vectors respectively related to the remaining motion compensating blocks UB2-UB34 other than the motion compensating block UB1. Thereafter, the process moves to the next step SP7.

In this connection, the motion-prediction compensating section 22, in the first to third series SS1-SS3, used the same one of the second uppermost layer search range TAR5-TAR8 and third uppermost layer search range TAR9-TAR12. However, this is not limiting, i.e., in case the search range is reduced each time sequentially changing to the smaller pixel-based size of motion compensating block, the form or the like may be different.

In the step SP7, the motion-prediction compensating section 22 detects as the final motion vector D3 (FIG. 7) an optimal motion vector capable of generating the smallest code amount among the motion vectors of the motion compensating blocks UB1-UB34 respectively detected by RD optimization in the steps SP5 and SP6. The process moves to the next step SP8.

In the step SP8, the motion-prediction compensating section 22 carries out a ¼ motion compensating process noted before for example in FIG. 1 according to the motion vector D3 detected in the step SP7, thereby generating predictive data D4 (FIG. 7). The process moves to the next step SP9.

In the step SP9, the motion-prediction compensating section 22 forwards the motion vector D3 detected in the step SP7 to the reversible coding section 18 and the predictive data D4 generated in the step SP8 to the adders 4 and 11. The process moves to the next step SP10, to end the motion-prediction compensating process.

OPERATION AND EFFECT

In the above configuration, the motion-prediction compensating section 5 takes as the uppermost layer TS a motion compensating block UB1 (FIG. 8) having the greatest pixel-based size among the motion compensating blocks defined under the JVT coding scheme. By thinning out over the maximum motion compensating block UB1, generated and hierarchized are a size-reduced block CBs on first lower layer having a ¼ size-reduction ratio and a 1/16 size-reduced block CBf on second lower layer having a 1/16 size-reduction ratio.

Then, the motion-prediction compensating section 5 uses a plurality of reduced reference images CF11-CF14 and CF1-CF4 of the lower layers (first lower layer BSf and second lower layer BSs) excepting the uppermost layer TS and the reduced blocks CBs and CBf, to hierarchically search for motion vectors and determine a first uppermost layer search range TAR1-TAR4 for motion vector search by RD-optimization on the uppermost layer TS (steps SP1-SP4).

In this case, the motion-prediction compensating section 5 detects a motion vector by carrying out a block matching based only on the absolute-value total sum of the difference from the size-reduced block without applying RD optimization which takes into account a generated code amount representative of a generated code amount of motion vector difference and a quantizing function, and makes a motion-compensation on the detected motion vector by linear interpolation at integer-pixel accuracy or ½-pixel accuracy without making a motion-compensation at ¼-pixel accuracy (FIG. 1) or ⅛-pixel accuracy (FIG. 2). Thus, a first uppermost layer search range TAR1-TAR4 can be determined by a reduced amount of operation.

In this state, the motion-prediction compensating section 5 detects motion vectors related respectively to the motion compensating blocks UB1-UB34 (FIG. 12) having respective pixel-based sizes by the use of the first uppermost layer search range TAR1-TAR4. Among the detected motion vectors, detected is the optimal and final motion vector D3 capable of generating the smallest amount of code.

Accordingly, despite the motion-prediction compensating section 5 is added by the new operation in an amount required in the process of up to determining the first uppermost layer search range TAR1-TAR4, restricted is the search range for RD optimization requiring by far greater operation amount than that operation amount. Correspondingly, process burden can be greatly reduced as compared to the case to detect a motion vector by searching for a motion vector throughout the entire macro-block on each motion compensating block in each pixel-based size as defined under the JVT coding scheme.

In addition, the motion-prediction compensating section 5, as noted above in FIG. 12, when detecting motion vectors related to the motion compensating blocks UB1-UB34 (FIG. 12) in the respective pixel-based sizes, reduces the search range each time of sequentially changing the motion compensating blocks from the greater pixel-based size to the smaller pixel-based size. This can reduce the process burden upon detecting a motion vector on a motion compensating block in a smaller pixel-based size. As a result, the overall process burden can be reduced furthermore.

According to the above configuration, the motion compensating block UB1 in the greatest pixel-based size is hierarchized. Using a plurality of reduced reference images CF11-CF14 and CF1-CF4 in the hierarchized first lower layer BSf and second lower layer BSs as well as reduced blocks CBs and CBf, the optimal motion vector in the uppermost layer TS is narrowed down to roughly determine a first uppermost layer search range TAR1-TAR4 by a reduced amount of operation. Thereafter, using the relevant search range TAR1-TAR4, a motion vector is detected by RD optimization. This can greatly reduce the process burden upon detecting the motion vector D3.

Other Embodiment

Incidentally, the above embodiment described the case for carrying out a motion-prediction compensation by sequentially changing to the respective motion compensating blocks having respective pixel-based sizes of vertical/horizontal 16×16 pixels, vertical/horizontal 8×16 pixels, vertical/horizontal 16×8 pixels, vertical/horizontal 8×8 pixels, vertical/horizontal 4×8 pixels, vertical/horizontal 8×4 pixels and vertical/horizontal 8×4 pixels. However, the invention is not limited to this but motion-prediction compensation may be made by sequentially changing to the motion compensating blocks in other various pixel-based sizes, e.g., vertical/horizontal 16×4 pixel-based size.

Furthermore, although the above embodiment described the case that the invention is applied to the JVT coding scheme, this is not limitative. In brief, the invention can be applied to the other various coding schemes that motion-prediction compensation is made by using a plurality of reference frame images while sequentially changing the pixel-based size of the motion compensating block on each motion compensating block that the objective frame image to be processed is divided of the successive frame images.

Furthermore, although the above embodiment described the case that thinning-out is made using Equation (1) taking as a FIR filter coefficient, the invention is not limited to this but other various FIR filter coefficient values may be used to generate a ½ phase.

Furthermore, although the above embodiment described the case that reduction is at the same reduction ratio in the horizontal and vertical directions, the invention is not limited to this but size-reduction may be at different size-reduction ratios between the horizontal direction and vertical direction.

Furthermore, although the above embodiment described the case that size-reduction is at ¼ and 1/16 size-reduction ratios, the invention is not limited to this, i.e., size-reduction may be at the other reduction ratio, e.g., 1 over the power of 2.

Furthermore, the above embodiment described the case to determine a motion vector depending upon an absolute-value total sum of differences between every pixel-based value within a 1/16 size-reduced block CBs and a pixel-based value of the corresponding block within the 1/16 size-reduced reference image CB11-CB14 corresponding to the relevant block CBs, or between every pixel-based value within a 1/4 size-reduced block CBf and a pixel-based value of the corresponding block within the 1/4 size-reduced reference image CB1-CB4 corresponding to the relevant block CBf. However, the invention is not limited to this but a square sum of the differences may be determined. In brief, motion vectors can be determined on the basis of the difference values between the size-reduced block pixel-based value and the pixel-based value of reduced reference image.

Furthermore, the above embodiment described the case, as noted above in FIG. 8, of using every reference size-reduced image CF11-CF14 and CF1-CF4 in the second lower layer BSs and first lower layer BSf as well as size-reduced blocks CBs and CBf, to determine the first uppermost layer search range TAR1-TAR4 on every reference frame image SF1-SF4 in the uppermost layer TS. However, the invention is not limited to this but may determine any of the uppermost layer search ranges TAR1-TAR4.

In this case, following the process of the step SP1 in the motion-prediction compensating process procedure mentioned in FIG. 9, added is a step of selecting, among reference size-reduced images CF11-CF14 (FIG. 8), a reference size-reduced image CF13, for example, that the difference of pixel-based value is minimum from the reduced block CBs by a block matching with a size-reduced block CBs on the second lower layer BSs. Using only the reference size-reduced image CF3 on first lower layer BSf corresponding to the reference size-reduced image CF13 selected in that step, the motion-prediction compensating section 22 carries out the processes of steps SP2 to SP4, to there by determine only the first uppermost layer search range TAR3.

In this manner, the motion-prediction compensating section 22, in the second lower layer BSs, selects a reference frame image SF3 for RD-optimization motion-vector search on the uppermost layer TS. This can reduce the respective amounts of operation corresponding to a plurality of reference size-reduced images CF11, CF13, CF14, CF1, CF3 and CF4 and a plurality of reference frame images SF1, SF3 and SF4. The overall process burden can be greatly reduced of up to detecting the final optimal motion vector D3 (FIG. 7).

Furthermore, where the motion compensating block UB1 to be processed is of a picture, the motion-prediction compensating section 22 in the second lower layer BSs may take, by a block matching with the reduced block CBs, a predictive-direction mode having a motion vector the pixel-based value difference is minimum from the size-reduced block CBs as a predictive-direction mode for the motion compensating block UB1 among the reference reduced images CF11-CF14 (FIG. 8), similarly to the foregoing selection of a reference frame image SF3. By doing so, the overall process burden can be further reduced of up to detecting the final optimal motion vector D3 (FIG. 7).

Furthermore, the above embodiment described the case that, as described in FIG. 11 as an example of determination of search ranges for example, the motion vector detected on the second lower layer is enlarged to determine as a first lower layer search range a range UAR1 including the peripheral several pixels of a rectangular range AR having, as apexes, the start and endpoints of that enlarged motion vector. However, the invention is not limited to this. In brief, the peripheral pixel-based range including an enlarged motion vector can determine a search range, e.g. trapezoidal range, rectangular-parallelepiped range, circular range including peripheral pixels having as apexes start and end points of that enlarged motion vector.

Figure 14:
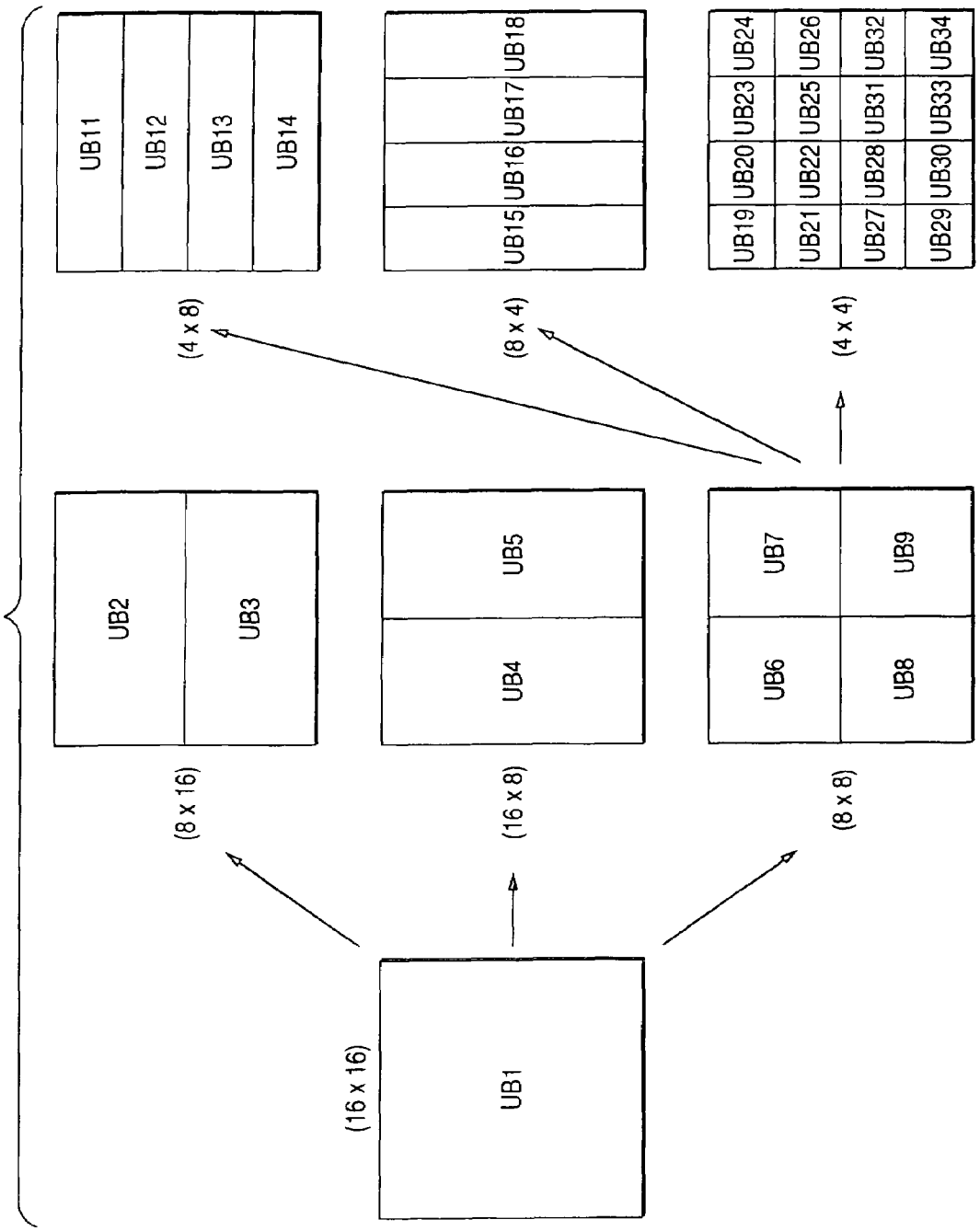
FIG. 14 is a schematic diagram for explaining a motion vector detecting sequence in another embodiment.

Furthermore, the above embodiment described the case to detect the optimal motion vectors for the motion compensating blocks UB2-UB34 in the order mentioned in FIG. 12. However, the invention is not limited to this but may detect the optimal motion vectors for the motion compensating blocks UB2-UB34 in the order as in FIG. 14 shown attached with the same references to the corresponding parts to FIG. 12.

Figure 15:
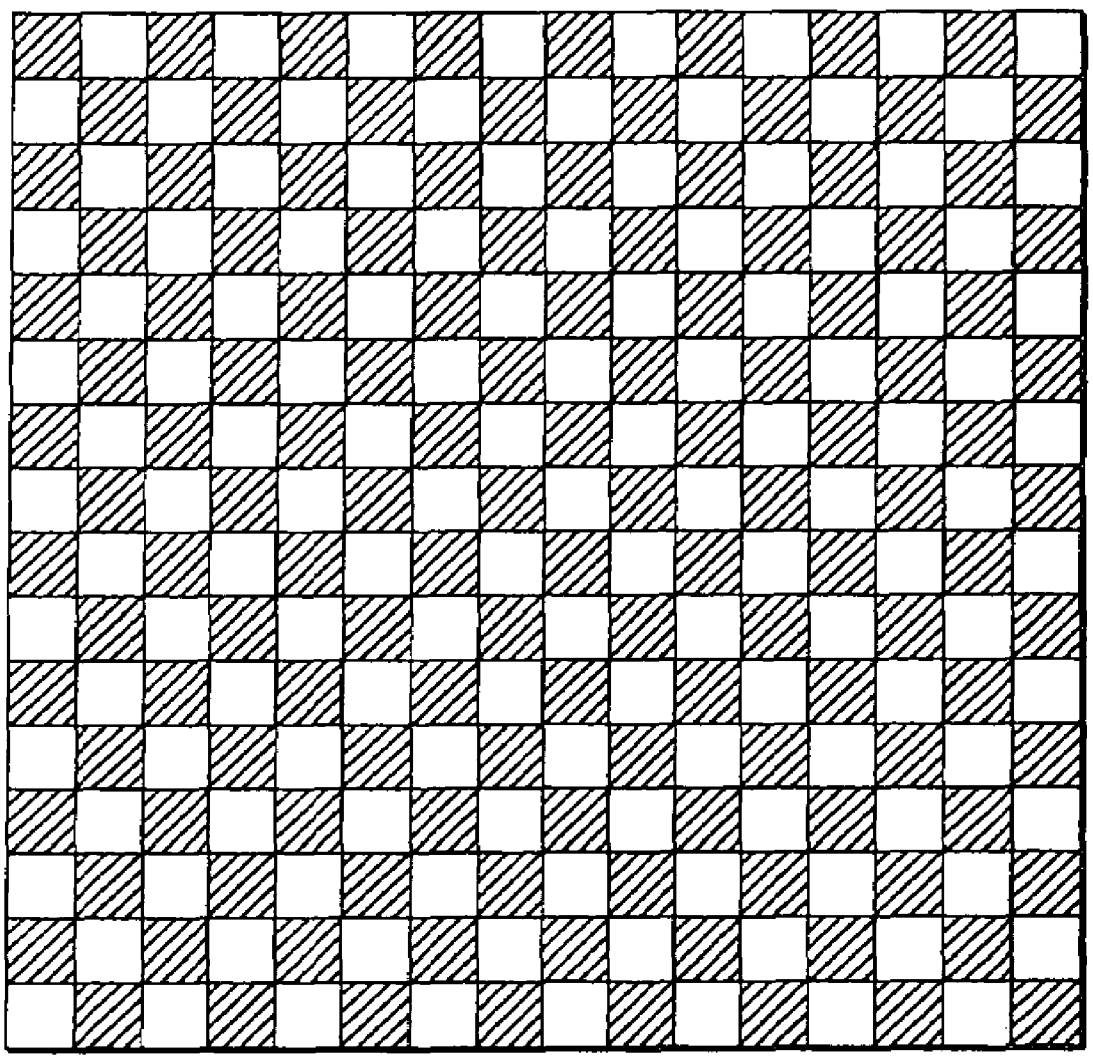
FIG. 15 is a schematic diagram for explaining a block matching according to another embodiment of the present invention.

Furthermore, the above embodiment described the case to make a block matching by the use of all the pixel-based values within the 1/16 size-reduced block CBs, 1/4 size-reduced block CBf or maximum motion compensating block UB1. However, the invention is not limited to this but may make a block matching by the use of every other pixel-based value with respect to each of the horizontal and vertical directions within the 1/16 size-reduced block CBs, 1/4 size-reduced block CBf or maximum motion compensating block UB1 as shown in FIG. 15. In this case, the process burden of upon carrying out a block matching can be reduced furthermore.

Furthermore, the above embodiment described the case to realize the processes in the motion-prediction compensating section 22 by a motion compensating program. The invention is not limited to this but the processes in part or the entire may be realized on the hardware means of exclusive integrated circuits or the like.

Furthermore, the above embodiment described the case to realize a size-reducing process by the hardware-configured size-reduced block generating section 21 (FIG. 7). However, the invention is not limited to this but the size-reducing process in the size-reduced block generating section 21 may be realized by being built in a motion-prediction compensating program in the motion-prediction compensating section 22.

Furthermore, the above embodiment described the case for the motion-prediction compensating section 5 as a motion-prediction compensator to implement a motion-prediction compensation by expanding in the internal RAM (not shown) a motion-prediction compensating program stored in the internal ROM (not shown) according to the foregoing motion-prediction compensating process of FIG. 9. The invention is not limited to this but motion-prediction compensation may be implemented by installing a program medium storing the motion-prediction compensating program.

The program medium may be realized by a semiconductor memory, a magnetic disk or the like, besides a packaged media such as a CD-ROM (Compact Disc-Read Only Memory) or DVD (Digital Versatile Disc). Meanwhile, the means for storing a program to the program medium may utilize a wired or wireless radio communicating medium, such as local area networks, the Internet or digital satellite broadcast. Storage may be through various interfaces, such as routers and MODEMs.

As described above, according to the present invention, when compensating for motion prediction on each of motion compensating blocks formed by dividing an objective frame image of successive frame images by using a plurality of reference frame images while sequentially changing pixel-based sizes of the motion compensating blocks, pixels are thinned out of the motion compensating block having a greatest one of the pixel-based size to be taken as an uppermost layer of among the pixel-based sizes, to generate and hierarchize a size-reduced block in a lower layer having a predetermined size-reduction ratio. Thereafter, motion vector search ranges are determined respectively within the reference frame images, on the basis of the size-reduced blocks and a plurality of size-reduced reference images size-reduced corresponding respectively to the size-reduction ratios of the size-reduced blocks. An optimal one of the motion vectors is detected while sequentially changing the pixel-based sizes of the motion compensating blocks by using the search ranges determined.

In this case, motion vectors can be detected only in a limited search range of the reference frame image without using the entire of the reference frame image. Thus, the process burden upon code processing can be reduced while possibly avoiding the lowering of image quality.

The present patent application contains subject matter related to that disclosed in Japanese Priority Document JP2002-350138, filed in the JPO on Dec. 2, 2002, the entire contents of which being incorporated herewith by reference.

What is claimed is:

1. A method, implemented on an apparatus configured to compensate motion prediction, of compensating motion prediction relative to each of a plurality of motion compensating blocks formed by dividing an objective frame image of successive frame images using a plurality of reference frame images, while sequentially changing pixel-based sizes of the plurality of motion compensating blocks, the method comprising:

thinning out, at the apparatus, pixels of a motion compensating block having a greatest pixel-based size to be taken as an uppermost layer of among blocks with smaller pixel-based sizes, each different pixel-based size of a block corresponding to a different layer of a frame image, to generate a size-reduced block in a lower layer having a predetermined size-reduction ratio;

determining, at the apparatus, motion vector search ranges respectively within the plurality of reference frame images based on a plurality of size-reduced reference images reduced in size corresponding to the size-reduction ratio of the size-reduced block by detecting motion vectors respectively within the plurality of size-reduced reference images and increasing a size of the motion vectors by linear interpolation to provide motion vector search ranges with respect to the plurality of reference frame images which correspond to an increased size of the motion vectors, wherein for each layer of a frame image except a lowermost layer, motion vectors are detected within a search range which includes a plurality of peripheral pixels in a rectangular range having apexes corresponding to start and end points of a motion vector detected in a lower layer; and detecting, at the apparatus, an optimal motion vector while sequentially changing the pixel-based sizes of the plurality of motion compensating blocks, using each of the motion vector search ranges determined in the determining motion vector search ranges, by taking the motion compensating block having the greatest pixel-based size and performing a plurality of separate and independent sequences of incrementally dividing the motion compensating block having the greatest pixel-based size into smaller regions, and applying a size-reduced motion vector search range which is based on the motion vector search ranges to each of the smaller regions, each sequence dividing the motion compensating block having the greatest pixel-based size into different smaller regions than each of the other sequences and each of the sequences is performed substantially simultaneously to each other.

2. A method of compensating motion prediction according to claim 1, wherein the determining further includes determining the motion vector search ranges depending upon respective differences in pixel-based values from respective size-reduced reference images.

3. A method of compensating motion prediction according to claim 2, wherein the determining carries out block matching sequentially on the size-reduced reference images with the size-reduced block, so as to determine the motion vector search ranges on the basis of an absolute-value sum of a difference between a pixel-based value within the size-reduced block and a pixel-based value within a block corresponding to the size-reduced block within a predetermined size-reduced reference image.

4. A method of compensating motion prediction according to claim 3, wherein the determining further includes determining the motion vector search ranges depending upon an absolute-value sum of differences between a pixel value of every other pixel with respect to a horizontal direction and a vertical direction of the size-reduced block and a pixel-based value within a corresponding portion of pixel-based values within the size-reduced block.

5. A method of compensating motion prediction according to claim 3, wherein the determining further includes determining as one of the motion vector search ranges a peripheral pixel range including an enlarged lower layer motion vector enlarged from a lower layer motion vector between a corresponding portion of pixels where an absolute-value sum of pixel-based values within the size-reduced block is minimum and the size-reduced block.

6. A method of compensating motion prediction according to claim 1, further comprising:

selecting only motion vector search ranges within the size-reduced reference images in which a difference of pixel-based values is minimized from the respective size-reduced blocks of among motion vector search ranges within the size-reduced reference images determined in the determining, wherein the detecting further includes detecting an optimal motion vector by using only the motion vector search ranges within the size-reduced reference images selected in the selecting.

7. A method of compensating motion prediction according to claim 1, wherein:

the detecting an optimal motion vector further includes detecting the optimal motion vector depending on respective differences in pixel-based values between the size-reduced block and the size-reduced reference images, a quantizing scale function, and a generation code amount for motion vector differences.

8. A method of compensating motion prediction according to claim 1, wherein the detecting an optimal motion vector further includes detecting an optimal motion vector based on a Rate Distortion optimization process.

9. An apparatus for compensating motion prediction relative to each of a plurality of motion compensating blocks formed by dividing an objective frame image of successive frame images using a plurality of reference frame images, while sequentially changing pixel-based sizes of the plurality of motion compensating blocks, the apparatus comprising:

hierarchizing means for thinning out pixels of a motion compensating block having a greatest pixel-based size to be taken as an uppermost layer of among blocks with smaller pixel-based sizes, each different pixel-based size of a block corresponding to a different layer of a frame image, to generate a size-reduced block in a lower layer having a predetermined size-reduction ratio;

search range determining means for determining motion vector search ranges respectively within the plurality of reference frame images based on a plurality of size-reduced reference images reduced in size corresponding to the size-reduction ratio of the size-reduced block by detecting motion vectors respectively within the plurality of size-reduced reference images and increasing a size of the motion vectors by linear interpolation to produce motion vector search ranges with respect to the plurality of reference frame images which correspond to an increased size of the motion vectors, wherein for each layer of a frame image except a lowermost layer, motion vectors are detected within a search range which includes a plurality of peripheral pixels in a rectangular range having apexes corresponding to start and end points of a motion vector detected in a lower layer; and detecting means for detecting an optimal motion vector while sequentially changing the pixel-based sizes of the plurality of motion compensating blocks, using the motion vector search ranges determined by the search range determining means, by taking the motion compensating block having the greatest pixel-based size and performing a plurality of separate and independent sequences of incrementally dividing the motion compensating block having the greatest pixel-based size into smaller regions, and applying a size-reduced motion vector search range which is based on the motion vector search ranges to each of the smaller regions, each sequence dividing the motion compensating block having the greatest pixel-based size into different smaller regions than each of the other sequences and each of the sequences is performed substantially simultaneously to each other.

10. An apparatus that compensates motion prediction relative to each of a plurality of motion compensating blocks formed by dividing an objective frame image of successive frame images using a plurality of reference frame images, while sequentially changing pixel-based sizes of the plurality of motion compensating blocks, the apparatus comprising:

a hierarchizing unit that thins out pixels of a motion compensating block having a greatest pixel-based size to be taken as an uppermost layer of among blocks with smaller pixel-based sizes, each different pixel-based size of a block corresponding to a different layer of a frame image, to generate a size-reduced block in a lower layer having a predetermined size-reduction ratio;

a search range determining unit that determines motion vector search ranges respectively within the plurality of reference frame images based on a plurality of size-reduced reference images reduced in size corresponding to the size-reduction ratio of the size-reduced block by detecting motion vectors respectively within the plurality of size-reduced reference images and increasing a size of the motion vectors by linear interpolation to produce motion vector search ranges with respect to the plurality of reference frame images which correspond to an increased size of the motion vectors, wherein for each layer of a frame image except a lowermost layer, motion vectors are detected within a search range which includes a plurality of peripheral pixels in a rectangular range having apexes corresponding to start and end points of a motion vector detected in a lower layer; and a detecting unit that detects an optimal motion vector while sequentially changing the pixel-based sizes of the plurality of motion compensating blocks, using the motion vector search ranges determined by the search range determining unit, by taking the motion compensating block having the greatest pixel-based size and performing a plurality of separate and independent sequences of incrementally dividing the motion compensating block having the greatest pixel-based size into smaller regions, and applying a size-reduced motion vector search range which is based on the motion vector search ranges to each of the smaller regions, each sequence dividing the motion compensating block having the greatest pixel-based size into different smaller regions than each of the other sequences and each of the sequences is performed substantially simultaneously to each other.

* * * * *